US008606245B1

(12) United States Patent
Eccelston et al.

(10) Patent No.: US 8,606,245 B1
(45) Date of Patent: Dec. 10, 2013

(54) SYSTEMS AND METHODS FOR HANDLING VOLUMINOUS CALLS TO CELL PHONES USING TRANSFER AGENT PROCESS

(75) Inventors: James J. Eccelston, Ponte Verde Beach, FL (US); Mark S. Love, Newberry Park, CA (US); Donald C. Borer, Kihei, HI (US)

(73) Assignee: Radius Solutions, Inc., Jacksonville, FL (US)

( * ) Notice: Subject to any disclaimer, the term of this patent is extended or adjusted under 35 U.S.C. 154(b) by 23 days.

(21) Appl. No.: 13/562,309

(22) Filed: Jul. 30, 2012

Related U.S. Application Data

(60) Provisional application No. 61/513,536, filed on Jul. 30, 2011.

(51) Int. Cl.
*H04M 3/42* (2006.01)

(52) U.S. Cl.
USPC ......................... 455/414.1; 455/417; 455/445

(58) Field of Classification Search
USPC ........ 455/410, 411, 412.1, 414.1, 417, 432.3, 455/445; 705/14.41, 14.52, 14.64, 14.66, 705/14.69, 44; 725/106, 107, 108, 109
See application file for complete search history.

(56) References Cited

U.S. PATENT DOCUMENTS

| | | | | |
|---|---|---|---|---|
| 6,542,733 | B1 * | 4/2003 | Dennis | 455/414.1 |
| 8,165,272 | B2 * | 4/2012 | Lindsey et al. | 379/9.04 |
| 8,233,925 | B1 * | 7/2012 | Boyle et al. | 455/466 |
| 2003/0061163 | A1 * | 3/2003 | Durfield | 705/44 |
| 2005/0075115 | A1 * | 4/2005 | Corneille et al. | 455/456.3 |
| 2006/0053047 | A1 * | 3/2006 | Garcia et al. | 705/14 |
| 2008/0262929 | A1 * | 10/2008 | Behr | 705/14 |
| 2010/0189249 | A1 * | 7/2010 | Shah et al. | 379/265.09 |
| 2012/0066731 | A1 * | 3/2012 | Vasquez et al. | 725/106 |

* cited by examiner

*Primary Examiner* — Jean Gelin
(74) *Attorney, Agent, or Firm* — Blank Rome LLP

(57) ABSTRACT

A computerized system for calling a plurality of cell phones in compliance with the TCPA, comprises a call center database; call center workstations operated by transfer agents; client workstations operated by client associates; and a computer processor that retrieves a cell phone number of a consumer to call, in response to an initiate call instruction from a respective transfer agent, dials the cell phone number, connects the call to the respective transfer agent if a live voice is detected; receives a transfer call request from the respective transfer agent, transfers the call with the one consumer to a client associate, using the cell number as the origination number of the call to identify the one consumer to the client associate, disconnects the connection between the one consumer and the respective transfer agent, and identifies a next consumer to call upon request by the transfer agent.

20 Claims, 18 Drawing Sheets

900

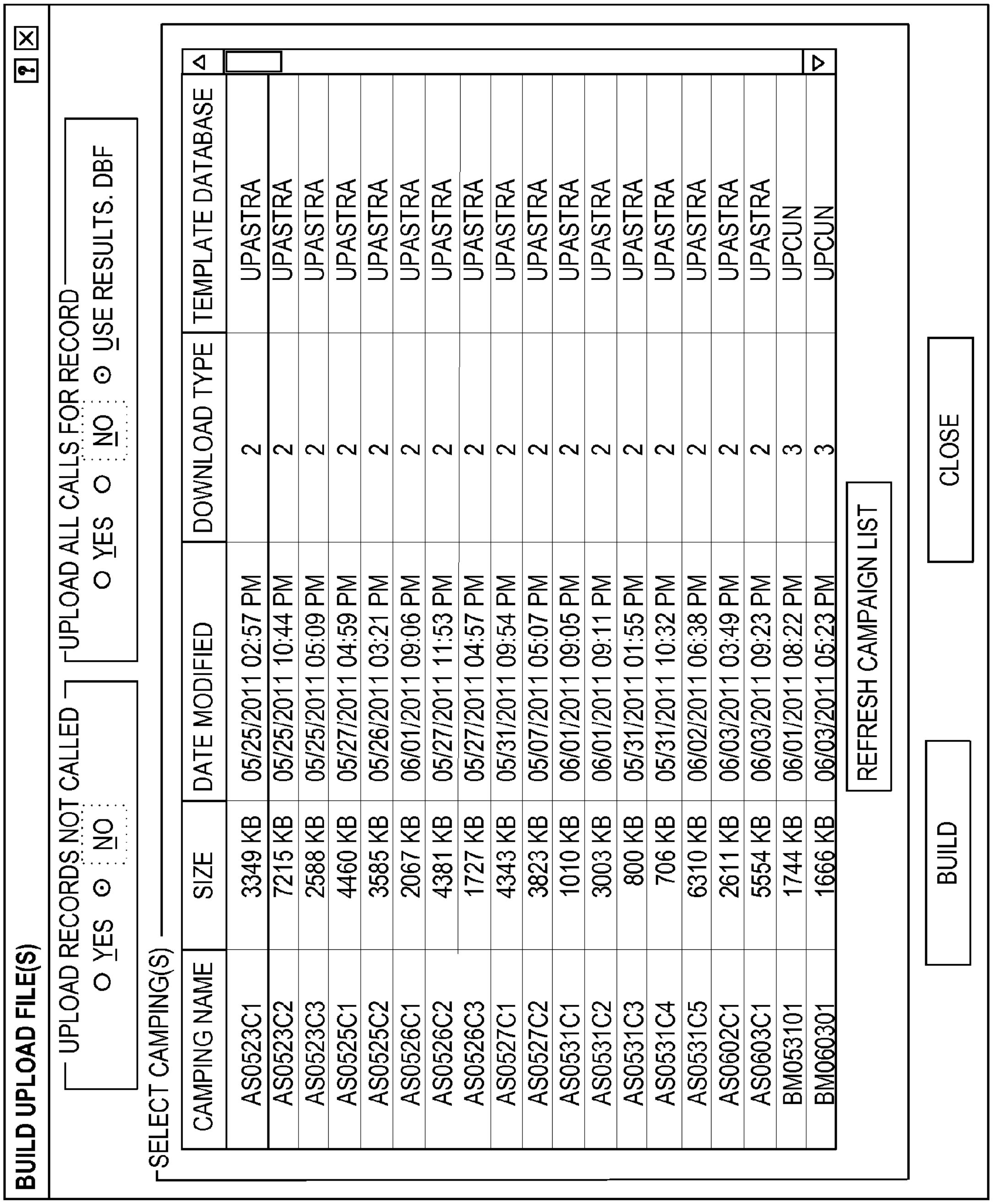

| CAMPING NAME | SIZE | DATE MODIFIED | DOWNLOAD TYPE | TEMPLATE DATABASE |
|---|---|---|---|---|
| AS0523C1 | 3349 KB | 05/25/2011 02:57 PM | 2 | UPASTRA |
| AS0523C2 | 7215 KB | 05/25/2011 10:44 PM | 2 | UPASTRA |
| AS0523C3 | 2588 KB | 05/25/2011 05:09 PM | 2 | UPASTRA |
| AS0525C1 | 4460 KB | 05/27/2011 04:59 PM | 2 | UPASTRA |
| AS0525C2 | 3585 KB | 05/26/2011 03:21 PM | 2 | UPASTRA |
| AS0526C1 | 2067 KB | 06/01/2011 09:06 PM | 2 | UPASTRA |
| AS0526C2 | 4381 KB | 05/27/2011 11:53 PM | 2 | UPASTRA |
| AS0526C3 | 1727 KB | 05/27/2011 04:57 PM | 2 | UPASTRA |
| AS0527C1 | 4343 KB | 05/31/2011 09:54 PM | 2 | UPASTRA |
| AS0527C2 | 3823 KB | 05/07/2011 05:07 PM | 2 | UPASTRA |
| AS0531C1 | 1010 KB | 06/01/2011 09:05 PM | 2 | UPASTRA |
| AS0531C2 | 3003 KB | 06/01/2011 09:11 PM | 2 | UPASTRA |
| AS0531C3 | 800 KB | 05/31/2011 01:55 PM | 2 | UPASTRA |
| AS0531C4 | 706 KB | 05/31/2011 10:32 PM | 2 | UPASTRA |
| AS0531C5 | 6310 KB | 06/02/2011 06:38 PM | 2 | UPASTRA |
| AS0602C1 | 2611 KB | 06/03/2011 03:49 PM | 2 | UPASTRA |
| AS0603C1 | 5554 KB | 06/03/2011 09:23 PM | 2 | UPASTRA |
| BM053101 | 1744 KB | 06/01/2011 08:22 PM | 3 | UPCUN |
| BM060301 | 1666 KB | 06/03/2011 05:23 PM | 3 | UPCUN |

CLIENT NAME

TRANSFER PERFORMANCE ANALYSIS REPORT

REPORT CREATED: WEDNESDAY, JULY 11 2012 5:54 PM

FOR PERIOD: WEDNESDAY, JULY 11, 2012 THRU WEDNESDAY, JULY 11, 2012

SELECTED CAMPAIGNS

ALL CAMPAIGNS WITH ACTIVITY

| MONTH | TOTAL HOURS | DIALS | CONNECTS | PASSED TO AGENTS | LIVE CONNECTS | % LIVE CONNECTS | RFC | %RPC | PASSED TO CLIENT | % PASSED TO CLIENT | TRANSFER PER HOUR |
|---|---|---|---|---|---|---|---|---|---|---|---|
| JUL-2 | 288: 14 | 54,270 | 17,730 | 14,632 | 14,196 | 26.16% | 3,489 | 24.58% | 348 | 2.45% | 1.21 |
| TOTAL | 238:14 | 54,270 | 17,730 | 14,632 | 14,196 | 26.16% | 3,489 | 24.58% | 348 | 2.45% | 1.21 |

| CAMPAIGN NAME | STARTED | FTE TIME HH:MM | TOTAL RECORDS | UNIQUE NUMBERS | NEW NUMBERS | PASSED TO AGENTS | SUCCESS | FAILURE | ATTEMPT | TRANSFERS COMP. | CANCEL | HANG UP |
|---|---|---|---|---|---|---|---|---|---|---|---|---|
| GM031308 | 3/24/11 16:59 | 8:07 | 3,027 | 2,582 | 2,532 | 525 | 2 | 3 | 5 | 1 | | 4 |
| GM031309 | 3/25/11 10:06 | 15:36 | 3,027 | 2,574 | 2,574 | 1,003 | 3 | | 4 | 1 | | 3 |
| GM031310 | 3/25/11 17:47 | :10 | 3,027 | 1,931 | 1,931 | 11 | | | | | | |
| GM032501 | 3/26/11 12:01 | 24:44 | 4,101 | 4,097 | 4,097 | 1,597 | 14 | 10 | 39 | 13 | 1 | 25 |
| GM032502 | 3/29/11 11:10 | 21:37 | 4,101 | 3,491 | 3,491 | 1,431 | 12 | 9 | 31 | 10 | 2 | 19 |
| GM032503 | 3/29/11 13:25 | 16:11 | 4,101 | 4,097 | 4,097 | 1,062 | 13 | 6 | 51 | 10 | 13 | 23 |
| GM032504 | 3/30/11 17:03 | 9:20 | 4,101 | 2,606 | 2,606 | 623 | 5 | 3 | 19 | 5 | 2 | 12 |
| GM032505 | 3/31/11 10::2 | 20:35 | 4,101 | 3,359 | 3,359 | 1,312 | 8 | 3 | 21 | 8 | 1 | 12 |
| GM032506 | 3/31/11 15:04 | 10:15 | 4,101 | 2,545 | 2,545 | 688 | 3 | 3 | 9 | 3 | | 6 |
| GM032507 | 4/1/11 10:16 | 4:53 | 4,101 | 3,313 | 3,313 | 216 | 2 | 1 | 5 | 2 | | 3 |
| GM032508 | 4/1/11 13:49 | 9:03 | 4,101 | 2,519 | 2,519 | 365 | 5 | | 3 | 1 | | 2 |
| GM0401Q1 | 4/4/11 10:59 | 21:14 | 3,196 | 3,173 | 3,173 | 1,311 | 17 | 7 | 42 | 15 | 3 | 24 |
| GM040102 | 4/5/11 19:50 | 9:40 | 3,196 | 2,111 | 2,111 | 657 | 5 | 2 | 10 | 4 | | 6 |
| PH031701 | 3/17/11 11:44 | 2:50 | 2,978 | 2,972 | 2,972 | 108 | | | | | | |
| PH031702 | 3/17/11 14:52 | 12:02 | 2,978 | 2,355 | 2,355 | 762 | | 3 | 8 | 1 | | 7 |
| PH031301 | 3/18/11 12 10 | 10:31 | 3,398 | 3,393 | 3,393 | 611 | 4 | 4 | 16 | 4 | 2 | 10 |
| PH031302 | 3/21/11 11:55 | 10:03 | 3,398 | 2,952 | 2,952 | 624 | 7 | 5 | 14 | 5 | | 9 |
| PH031303 | 3/21/11 15:52 | 6:55 | 3,398 | 2,456 | 2,456 | 376 | 5 | | 6 | 3 | | 3 |
| PH031304 | 3/21/11 19:40 | 3:25 | 3,398 | 2,426 | 2,426 | 231 | 1 | | 2 | 1 | | 1 |
| PH031305 | 3/22/11 11:55 | 14:42 | 3,398 | 2,870 | 2,870 | 909 | 7 | 4 | 19 | 7 | | 12 |
| PH031306 | 3/22/11 17:50 | 7:08 | 3,398 | 2,332 | 2,332 | 481 | 4 | | 8 | 3 | 1 | 4 |
| PH031307 | 3/24/11 17:02 | 8:1 | 3,398 | 2,776 | 2,776 | 536 | 2 | 2 | 3 | 1 | | 2 |

PAGE 2 OF 3

CLIENT NAME

TRANSFER AGENT ANALYSIS REPORT

REPORT CREATED: FRIDAY, NOVEMBER 12, 2010 9:00 PM

FOR PERIOD: FRIDAY, NOVEMBER 12, 2010 THRU FRIDAY, NOVEMBER 12, 2010

| AGENT | STARTED | FINISHED | HH:MM | SUCCESS | FAILURE | ATTEMPTS | COMPLETE | CANCELLED | HANG UPS |
|---|---|---|---|---|---|---|---|---|---|
| 2059 | 11/12/2010 8:00:10AM | 11/12/2010 4:55:52PM | 7:55 | | 1 | 23 | 6 | 1 | 16 |
| 2127 | 11/12/2010 7:59:53AM | 11/12/2010 4:55:45PM | 7:28 | 5 | | 10 | 5 | | 5 |
| 2131 | 11/12/2010 8:01:37AM | 11/12/2010 4:56:20PM | 7:08 | 1 | 1 | 1 | | | 1 |
| 2132 | 11/12/2010 8:06:23AM | 11/12/2010 4:55:02PM | 6:56 | 3 | 3 | 15 | 3 | | 12 |
| 2133 | 11/12/2010 12:18:45PM | 11/12/2010 4:56:27PM | 4:04 | 1 | | 2 | 1 | | 1 |
| 2135 | 11/12/2010 12:06:20PM | 11/12/2010 4:56:13PM | 3:56 | 1 | 2 | 2 | 1 | | 1 |
| 2142 | 11/12/2010 12:04:07PM | 11/12/2010 4:55:08PM | 3:43 | 2 | | 6 | 2 | | 4 |
| TOTALS FOR ASCL1103 | 11/12/2010 7:59:53AM | 11/12/2010 4:56:27PM | 41:10 | 13 | 7 | 59 | 18 | 1 | 40 |
| TOTALS | 11/12/2010 7:59:53AM | 11/12/2010 4:56:27PM | 41:10 | 13 | 7 | 59 | 18 | 1 | 40 |
| 2059 | 11/12/2010 8:00:10AM | 11/12/2010 4:55:52PM | 7:55 | | 1 | 23 | 6 | 1 | 16 |
| 2127 | 11/12/2010 7:59:53AM | 11/12/2010 4:55:45PM | 7:23 | 5 | | 10 | 5 | | 5 |
| 2131 | 11/12/2010 8:01:37AM | 11/12/2010 4:56:20PM | 7:03 | 1 | 1 | 1 | | | 1 |
| 2132 | 11/12/2010 8:06:23AM | 11/12/2010 4:55:02PM | 6:56 | 3 | 3 | 15 | 3 | | 12 |
| 2133 | 11/12/2010 12:18:45PM | 11/12/2010 4:56:27PM | 4:04 | 1 | | 2 | 1 | | 1 |
| 2135 | 11/12/2010 12:06:20PM | 11/12/2010 4:56:13PM | 3:56 | 1 | 2 | 2 | 1 | | 1 |
| 2142 | 11/12/2010 12:04:07PM | 11/12/2010 4:55:08PM | 3:43 | 2 | | 6 | 2 | | 4 |
| TOTAL | 11/12/2010 7:59:53AM | 11/12/2010 4:56:27PM | 41:10 | 13 | 7 | 59 | 18 | 1 | 40 |

FIG. 14

DIALER PERFORMANCE E REPORT

REPORT CREATED: THURSDAY, APRIL 07, 2011 10:16 AM

FOR PERIOD: THURSDAY, MARCH 17, 2011 THRU WEDNESDAY, APRIL 06, 2011

SELECTED CAMPAIGNS

| | | | |
|---|---|---|---|
| GM031701 | GM031702 | GM031801 | GM031802 |
| GM031803 | GM031802 | GM031805 | GM031806 |
| GM031807 | GM031808 | GM031809 | GM031810 |
| GM032501 | GM032502 | GM032503 | GM032504 |
| GM032505 | GM032506 | GM032507 | GM032508 |
| GM040101 | GM040102 | GM031701 | GM031702 |
| PH031801 | PH031802 | PH031803 | PH031804 |
| PH031805 | PH031806 | PH031807 | PH031808 |
| PH031809 | PH032501 | PH032502 | PH032503 |
| PH032504 | PH032505 | PH032506 | PH032507 |
| PH032508 | PH032509 | PH040101 | PH040102 |

| DESCRIPTION | HOST RESULTS | OUR RESULT | TOTAL | PERCENT |
|---|---|---|---|---|
| | | SUCCESSES | | |
| PROMISE | PP | U12 | 1 | 0.00 |
| TALK TO DEBTOR | TT | U13 | 6 | 0.01 |
| TRANSFER FAILED | XF | U02 | 117 | 0.013 |
| TRANSFER SUCESSFUL | XS | U01 | 198 | 0.21 |
| | | TOTALS: | 322 | 0.35% OF TOTAL RESULTS |
| | | CONNECTS | | |
| ANSWER MACTIINE | AM | U05 | 7,648 | 8.24 |
| ANSWEFWACHINE | AMC | Z06D6 | 17,396 | 18.73 |
| DETECT | CM | U10 | 36 | 0.04 |
| DMC | DA | U09 | 112 | 0.12 |
| DEAD AIR | HU | U03 | 686 | 0.74 |
| HUNG UP | MA | U04 | 17,039 | 18.35 |
| NO ANSWER | SP | U0S | 34 | 0.04 |
| SPANISH | TH | U08 | 300 | 0.32 |
| TALK TO 3RD PARTY | WN | U07 | 1,296 | 1.40 |
| WRONG NUMBER | | TOTALS: | 44,547 | 47.97 % OF TOTAL RESULTS |

PAGE 1 OF 2

OTHER

| DESCRIPTION | HOST RESULT | OUR RESULT | TOTAL | PERCENT |
|---|---|---|---|---|
| ISDN PROTOCOL ERROR | C11 | Y33 | 22,378 | 24.10 |
| ISDN BARRED INBOUND | C29 | Y57 | 97 | 0.10 |
| CAMPAIGN STOPPED | CSP | Y10 | 18 | 0.02 |
| FAX | FAX | Y03 | 11 | 0.01 |
| NO ANSWER | NAS | Z05 | 20,158 | 21.71 |
| LINE FAULT | OTR | Y02 | 907 | 0.98 |
| DISCONTINUE | OTR | Z02 | 205 | 0.22 |
| BUSY | PNB | Z03 | 600 | 0.65 |
| OUT OF TIMEZONE | PRN | Y05 | 565 | 0.61 |
| REAL-TIME EXCLUDE | RTE | Y11 | 1,130 | 1.22 |
| OPINT INVALID | SIT | Y01 | 1,923 | 2.07 |
| | | **TOTALS:** | **47,992** | **51.63 % OF TOTAL RESULTS** |

| | |
|---|---|
| TOTAL SUCCESSES | 322 |
| TOTAL CONNECTS | 44547 |
| TOTAL OTHER | 47992 |
| TOTAL RESULTS | 92,061 |
| TOTAL DIAL TIME | 58:06:26 |
| TOTAL DIALS PER HOUR | 189.80 |
| TOTAL CONNECTS PER HOUR | 91.05 |

PAGE 2 OF 2

FIG. 16

SYSTEMS AND METHODS FOR HANDLING VOLUMINOUS CALLS TO CELL PHONES USING TRANSFER AGENT PROCESS

CROSS REFERENCE TO RELATED APPLICATION

This application claims the benefit under 35 U.S.C. §119 (e) of U.S. Provisional Patent Application No. 61/513,536, entitled "Systems and Methods for Handling Voluminous Calls to Cell Phones Using Transfer Agent Process," filed Jul. 30, 2011, which is incorporated herein by reference in its entirety.

FIELD OF THE PRESENT INVENTION

The present invention relates generally to call center technologies and, more particularly, to methods and systems for enabling highly efficient and effective methods and systems for calling a voluminous number of cellular or mobile phone numbers in a manner that is compliant with restrictions and obligations imposed by the Telephone Consumer Protection Act.

BACKGROUND OF THE PRESENT INVENTION

The world has changed over the last 10 years. According to the CTIA, the International Association for the Wireless Telecommunications Industry, cellular/mobile phone (hereinafter "cell phone") usage in the United States alone has grown by over 46% from 2005-2010, while at the same time, the growth in cell-phone-only households (i.e., those households that have disconnected their home land-line phone and now only use a cell phone) has increased by an astounding 217%! The result is that at least 85% of people in the United States now have a cell phone and at least 25% of all households in the United States can no longer be reached on a conventional landline.

The Telephone Consumer Protection Act (hereinafter, the "TCPA" or the "Act") was originally enacted to protect any phone user from aggressive telemarketing practices that were deemed a nuisance and an invasion of privacy. In addition, because many cell phone users have plans that charge by the minute or number of calls used by the phone, consumers were obviously not happy to receive unwanted sales or telemarketing calls on their cell phones that would use up limited time or increase the cost of using the cell phone. As often happens, however, laws enacted for a specific and useful purpose are often written and/or interpreted in an overly broad manner and have unintended and negative consequences on legitimate businesses and business practices in the industry. In this case, the TCPA significantly limits the ability of legitimate businesses, directly or through an outsourced call center, to use communication technology effectively to call cell phones of the existing consumer base of such business. Specifically, the TCPA prohibited any business or call center from calling a cell phone using an "Automatic Telephone Dialing System" or leaving an artificial or pre-recorded message for the called party, if the call is made without the prior "Express Consent" of the recipient and if the recipient is charged for the call. Although it was assumed that legitimate businesses could easily obtain "Express Consent" from their own consumers and, thus, avoid the onerous limitations and penalties of the TCPA intended for telemarketers and advertisers; in practice, because consumers frequently change their cell phone numbers, it has become effectively impossible for legitimate businesses and call centers to rely upon prior "Express Consent" from their consumers because a call to a cell number that has been transferred by a consenting consumer to a non-consumer or other third party is deemed a violation of the Act and subjects the business and call center to potential liability and fines.

The prohibitions imposed by the TCPA, by associated FCC regulations, and by recent case law interpreting the Act and its regulations, plus the severe penalties mandated by the Act for noncompliance, whether intentional or not, have greatly increased the risk and burden on legitimate businesses that need to reach out to a large portion of their consumer base. The TCPA significantly limits call centers (and any similar companies or business departments) from calling their consumer base on a large scale in an efficient and cost-effective manner. Thus, there is a definite need in the industry to enable businesses and call centers to reach the consumer base of a legitimate business (i.e., one that is not a telemarketer or advertisement agency) on a large scale in an efficient and cost-effective manner.

A number of service providers have offered "Preview Dialing" as a potential solution to this issue. Preview Dialing is a solution in which an Automatic Telephone Dialing System (ATDS) presents a call center agent with information about the prospect, consumer, or consumer (which terms can be used interchangeably herein) to be called and requires a specific response or decision by the agent to make the call. However, recent court decisions have held that when evaluating whether equipment is an ATDS that violates restrictions in the Act, the determination is merely whether the communication equipment has the capacity "to store or produce telephone numbers to be called, using a random or sequential number generator." Thus, a system need not actually store, produce, or call randomly or sequentially generated telephone numbers in order to qualify as an ATDS, it need only have the capability to do so. Such court decisions have caused most companies to conclude, incorrectly, that mere "Preview Dialing" is not in compliance with the TCPA.

Other service providers have resorted to using outsourced, offshore call centers with agents who hand-dial cell phone numbers, which clearly avoids the limitations of "automated" dialing equipment prohibited by the Act. When a cell number is called and the call center agent verifies that the correct or "Right Party" has been reached, such offshore agents can then either communicate the purpose of the call with the cell phone user or transfer the call to a more highly trained call center agent in the United States to take over the communication process with the consumer. Obviously, using cheap labor overseas to hand-dial each number avoids the limitations imposed by the Act, but such a process is very slow, inefficient, and often ineffective. In addition, most hand-dialing systems, while compliant with the TCPA, typically do not offer the management and reporting functions needed to evaluate the effectiveness of the call center or do not adequately maintain electronic records to confirm and maintain an audit trail confirming that the calling process was implemented in a TCPA-compliant manner.

For these and many other reasons, there remains a need in the industry for systems, processes, and devices that enable call centers and legitimate businesses to contact their consumer base on a large scale in an efficient and cost-effective manner, while still maintaining compliance with the TCPA. This is especially true as the growth in the number of cell phones continues to increase and the number of landlines continues to decrease.

For these and many other reasons, there is a general need, in a first aspect of the present invention, for a computerized system for efficiently and quickly calling cellular/mobile phones ("cell phones") of a large group of consumers/customers ("consumers") of a client in a manner compliant with the Telephone Consumer Protection Act ("TCPA"), comprising a call center database to contain a cleaned consumer call list of the client, wherein the cleaned consumer call list contains information associated with each of the large group of consumers of the client and wherein the information includes the name, client account number, and cell phone number of each respective consumer; a plurality of call center workstations, wherein each call center workstation is operated by a respective transfer agent, includes an interactive display for use by the respective transfer agent, and is configured to enable the respective transfer agent to initiate a call to the cell phone number of a respective one of the large group of consumers of the client, speak with the respective one consumer, and transfer the call once the respective transfer agent has confirmed that the recipient of the call is the respective one consumer; a plurality of client workstations, wherein each client workstation is operated by a respective client associate, is configured to receive the call with the respective one consumer when transferred by the respective transfer agent, and includes an interactive display for use by the respective client associate; and a cell phone communication processor in electronic communication with the call center database and with each of the call center workstations, wherein the cell phone communication processor includes non-transitory computer-readable media, and wherein the computer-readable media has computer-readable instructions which, when executed by the cell phone communication processor, causes the cell phone communication processor to perform the steps of: (i) retrieving the cell phone number of the respective one consumer from the cleaned consumer call list stored in the call center database; (ii) receiving an initiate call instruction from the respective transfer agent to initiate the call; (iii) in response to the initiate call instruction received from the respective transfer agent, dialing the cell phone number of the respective one consumer; (iv) determining if a live voice is detected when the call is answered by the recipient and, if so, connecting the call to the respective transfer agent; (v) displaying the information associated with the respective one consumer on the interactive display of the respective work station of the respective transfer agent; (vi) thereafter, receiving a transfer call instruction from the respective transfer agent to transfer the call to the respective client workstation of the respective client associate; (vii) in response to the transfer call instruction, transferring the call to the respective client associate and providing the cell phone number of the respective one consumer as the origination number of the call; (viii) after the call has been successfully transferred and a connection established between the respective one consumer and the respective client associate, disconnecting the connection between the respective one consumer and the respective transfer agent; and (ix) identifying a next consumer from the cleaned consumer call list to call and then awaiting a next initiate call instruction to be received from the respective transfer agent.

In a feature of the first aspect, the computerized system further includes a client database for storing an initial consumer call list. In another feature, the information associated with each of the large group of consumers included in the initial consumer call list is updated upon completion of calling all of the cell phone numbers from the cleaned consumer call list. In another feature, the information associated with each of the large group of consumers included in the initial consumer call list is updated in the client database based on the results of the call between the respective one consumer and the respective client associate. In yet another feature, the information associated with each of the large group of consumers included in the initial consumer list is updated in the client database based on the results of the call between the respective one consumer and the respective transfer agent. In another feature, the cell phone communication processor performs the additional step of updating the information associated with the respective one consumer in the call center database after dialing the cell phone number of the respective one consumer. In yet a further feature, the origination number of the call between the respective one consumer and the respective client associate is used to obtain information associated with the respective one consumer from the client database and to display said information during the call on the interactive display of the respective work station of the respective client associate.

In another feature of the first aspect, the initial consumer call list is uploaded from the client database to the call center database. In yet a further feature, the cell phone communication processor performs the additional step of converting the initial consumer call list into the cleaned consumer call list. In a further feature, the cell phone communication processor converts the initial consumer call list to the cleaned consumer call list by eliminating any consumer records in which the cell phone number (i) has been converted to a landline number, (ii) is incomplete or has an invalid area code; (iii) is included on a "no call" list; (iv) is identified as a number that always rolls to an answering machine; (v) is identified as a number that is never answered; and (vi) is identified as a duplicate cell phone number used with two or more consumer records.

In a yet further feature, the respective transfer agent provides the initiate call instruction to the cell phone communication processor by clicking on a button displayed on the interactive display of the respective work station of the respective transfer agent.

In another feature, the respective transfer agent provides the initiate call instruction to the cell phone communication processor by disconnecting the connection with the respective one consumer. In yet a further feature, the respective transfer agent remains on the call between the respective one consumer and the respective client associate for a period of time after the call has been transferred to the respective client associate but before disconnecting the connection with the respective one consumer.

In another feature, the respective transfer agent drops off or disconnects from the call between the respective one consumer and the respective client associate immediately upon transferring the call to the respective client associate.

In another feature of the first aspect, the cell phone communication processor only permits a call to be made to the respective one consumer during a permitted time window defined by the TCPA and wherein the respective one consumer is assumed to be in a time zone based on (i) the area code of the cell phone number, (ii) the zip code of the address of the respective one consumer, or (iii) the overlap of both the area code and zip code.

In a further feature, if the cell phone communication processor determines that a live voice is not detected, the cell phone communication processor then determines whether the call has been answered by an answering machine. If the cell phone communication processor determines that the call has been answered by the answering machine, the cell phone communication processor disconnects the call. On the other hand, if the cell phone communication processor determines that the call has not been answered by the answering machine, the cell phone communication processor hangs up the call, updates the information associated with the respective one consumer in the call center database to indicate a disposition of the call, identifies the next consumer from the cleaned consumer call list to call, and then waits for the next initiate call instruction to be received from the respective transfer agent.

In yet a further feature, if the call with the cell phone number is successfully connected to the respective transfer agent but not successfully transferred to the respective client associate, the cell phone communication processor receives an explanation for the failed call transfer from the respective transfer agent, updates the information associated with the respective one consumer in the call center database to indicate the explanation for the failed call transfer, identifies the next consumer from the cleaned consumer call list to call, and then awaits the next initiate call instruction to be received from the respective transfer agent.

In yet a further feature, the cell phone communication processor provides a list on the interactive display of the respective work station of the respective transfer agent from which the respective transfer agent is able to select the explanation for the failed call transfer.

In a second aspect, in a computerized system having a cell phone communication processor, wherein the processor includes non-transitory computer-readable media containing computer-readable instructions which, when executed by the cell phone communication processor, perform a method of efficiently and quickly calling cellular/mobile phones ("cell phones") of a large group of consumers/customers ("consumers") of a client in a manner compliant with the Telephone Consumer Protection Act ("TCPA"), comprising the steps of: (a) uploading an initial consumer call list from the client; (b) converting the initial consumer call list into a cleaned consumer call list, wherein the cleaned consumer call list contains information associated with each of the large group of consumers of the client and wherein the information includes the name, client account number, and cell phone number of each respective consumer; (c) storing the cleaned consumer call list in a call center database, the cell phone communication processor in electronic communication with the call center database; (d) retrieving a cell phone number of a respective one consumer from the cleaned consumer call list; (e) receiving an initiate call instruction from a respective transfer agent to initiate a call to the respective one consumer, wherein the respective transfer agent operates a call center workstation in electronic communication with the cell phone communication processor; (f) in response to the initiate call instruction received from the respective transfer agent, dialing the cell phone number of the respective one consumer; (g) determining if a live voice is detected when the call is answered by a recipient of the call and, if so, connecting the call to the respective transfer agent; (h) displaying the information associated with the respective one consumer on an interactive display of the call center work station of the respective transfer agent; (i) thereafter, receiving a transfer call instruction from the respective transfer agent to transfer the call to a client workstation of a respective client associate; (j) in response to the transfer call instruction, transferring the call to the respective client associate and providing the cell phone number of the respective one consumer as the origination number of the call; (k) after the call has been successfully transferred and a connection established between the respective one consumer and the respective client associate, disconnecting the connection between the respective one consumer and the respective transfer agent; (l) identifying a next consumer from the cleaned consumer call list to call; and then (m) awaiting a next initiate call instruction to be received from the respective transfer agent.

In a feature of the second aspect, updating the information associated with each of the large group of consumers included in the initial consumer call list upon completion of calling of all of the cell phone numbers from the cleaned consumer call list. In another feature, updating in the client database the information associated with each of the large group of consumers included in the initial consumer call list based on the results of the call between the respective one consumer and the respective client associate. In yet another feature, updating in the client database the information associated with each of the large group of consumers included in the initial consumer list based on the results of the call between the respective one consumer and the respective transfer agent. In another feature, the cell phone communication processor performs the additional steps of updating the information associated with the respective one consumer in the call center database after dialing the cell phone number of the respective one consumer. In yet a further feature, providing the origination number of the respective one consumer to the respective client associate to enable the respective client associate to obtain information associated with the respective one consumer and to enable display of said information during the is call on an interactive display of the respective work station of the respective client associate.

In another feature of the second aspect, the cell phone communication processor performs the step of converting the initial consumer call list into the cleaned consumer call list by eliminating any consumer records in which the cell phone number (i) has been converted to a landline number, (ii) is incomplete or has an invalid area code; (iii) is included on a "no call" list; (iv) is identified as a number that always rolls to an answering machine; (v) is identified as a number that is never answered; and (vi) is identified as a duplicate cell phone number used with two or more consumer records.

In a yet further feature, receiving the initiate call instruction when the respective transfer agent clicks on a button displayed on the interactive display of the respective work station of the respective transfer agent.

In another feature, receiving the initiate call instruction when the respective transfer agent disconnects the connection with the respective one consumer. In yet a further feature, the respective transfer agent remains on the call between the respective one consumer and the respective client associate for a period of time after the call has been transferred to the respective client associate but before disconnecting the connection with the respective one consumer.

In another feature, the respective transfer agent drops off the call between the respective one consumer and the respective client associate immediately upon transferring the call to the respective client associate.

In another feature of the second aspect, further comprising the step of only permitting a call to be made to the respective one consumer during a permitted time window defined by the TCPA and wherein the respective one consumer is assumed to be in a time zone based on (i) the area code of the cell phone number, (ii) the zip code of the address of the respective one consumer, or (iii) the overlap of both the area code and zip code.

In a further feature, if the cell phone communication processor determines that a live voice is not detected, the cell phone communication processor then determines whether the call has been answered by an answering machine. If the cell phone communication processor determines that the call has been answered by the answering machine, the cell phone communication processor disconnects the call. On the other hand, if the cell phone communication processor determines that the call has not been answered by the answering machine, the cell phone communication processor hangs up the call, updates the information associated with the respective one consumer in the call center database to indicate a disposition of the call, identifies the next consumer from the cleaned consumer call list to call, and then awaits the next initiate call instruction to be received from the respective transfer agent.

In yet a further feature, if the call with the cell phone number is successfully connected to the respective transfer agent but not successfully transferred to the respective client associate, the cell phone communication processor receives an explanation for the failed call transfer from the respective transfer agent, updates the information associated with the respective one consumer in the call center database to indicate the explanation for the failed call transfer, identifies the next consumer from the cleaned consumer call list to call, and then awaits the next initiate call instruction to be received from the respective transfer agent.

In yet a further feature, providing a list on the interactive display of the respective work station of the respective transfer agent from which the respective transfer agent is able to select the explanation for the failed call transfer.

The present inventions as described in greater detail herein meet one or more of the above-referenced needs as will become apparent from the disclosure and details that follow.

SUMMARY OF THE PRESENT INVENTION

The present invention relates generally to call center technologies and, more particularly, to methods and systems for enabling highly efficient and effective methods and systems for calling a voluminous number of cellular or mobile phone numbers in a manner that is compliant with restrictions and obligations imposed by the Telephone Consumer Protection Act.

According to the FCC's Declaratory Ruling released on Jan. 4, 2008, in response to the ACA's request for clarification of the TCPA related to the collections industry, the FCC broadened its definition of an ATDS to include a predictive dialer. Based on this ruling and current interpretations of the Act, for a device or system not to be an ATDS, it can neither do nor have the capacity to do any of the following:

- play prerecorded or artificial voice,
- dial without human intervention,
- engage more than one phone line for an agent,
- predict an agent's availability to take a call,
- abandonment or cause long periods of dead air, and
- create or randomize phone numbers.

On the other hand, a device, system, or process that would still address the needs of calling cell phones in a manner compliant with the TCPA would provide one or more of the following features and functionality:

- Be able to leverage skilled off-shore transfer agents, as necessary;
- Provide a suitable "Right Party" verification script;
- Enable warm transfer of calls from a call center to a business representative;
- Provide skilled and simple routing of a cell phone call to an onshore associate;
- Enable point and click human dialing;
- Provide caller ID/ANT displayed to the cell phone user to increase return calls;
- Provide comprehensive and relevant reporting;
- Have the ability to upload reporting and data files of daily results;
- Provide a wireless number identification scrub to ensure system only calls cell numbers;
- Provide a valid phone number scrub to ensure only "active" and in use cell phone numbers are called;
- Offer call recording throughout the process, if desired by the business or call center;
- Provide call "Progress Analysis" of all calls made within the system;
- Ensure time zone and time of day call restriction compliance required by the Act;
- Provide management and quality assurance; and
- Provide for data security, storage, encryption, and audit reporting as necessary.

Briefly described, aspects of the present invention include the following: in a first aspect, a computerized system for efficiently and quickly calling cellular/mobile phones ("cell phones") of a large group of consumers/customers ("consumer") of a client in a manner compliant with the Telephone Consumer Protection Act ("TCPA"), comprising (a) a call center database to contain a cleaned consumer call list of the client, wherein the cleaned consumer call list contains information associated with each of the large group of consumers of the client and wherein the information includes the name, client account number, and cell phone number of each respective consumer; (b) a plurality of call center workstations, wherein each call center workstation is operated by a respective transfer agent, includes an interactive display for use by the respective transfer agent, and is configured to enable the respective transfer agent to initiate a call to the cell phone number of a respective one of the large group of consumers of the client, speak with the respective one consumer, and transfer the call once the respective transfer agent has confirmed that the recipient of the call is the respective one consumer; (c) a plurality of client workstations, wherein each client workstation is operated by a respective client associate, is configured to receive the call with the respective one consumer when transferred by the respective transfer agent, and includes an interactive display for use by the respective client associate; and (d) a cell phone communication processor in electronic communication with the call center database and with each of the call center workstations, wherein the cell phone communication processor includes non-transitory computer-readable media, and wherein the computer-readable media has computer-readable instructions which, when executed by the cell phone communication processor, causes the cell phone communication processor to perform the steps of: (i) retrieving the cell phone number of the respective one consumer from the cleaned consumer call list stored in the call center database; (ii) receiving an initiate call instruction from the respective transfer agent to initiate the call; (iii) in response to the initiate call instruction received from the respective transfer agent, dialing the cell phone number of the respective one consumer; (iv) determining if a live voice is detected when the call is answered by the recipient and, if so, connecting the call to the respective transfer agent; (v) displaying the information associated with the respective one consumer on the interactive display of the respective work station of the respective transfer agent; (vi) thereafter, receiving a transfer call instruction from the respective transfer agent to transfer the call to the respective client workstation of the respective client associate; (vii) in response to the transfer call instruction, transferring the call to the respective client associate and providing the cell phone number of the respective one consumer as the origination number of the call; (viii) after the call has been successfully transferred and a connection established between the respective one consumer and the respective client associate, disconnecting the connection between the respective one consumer and the respective transfer agent; and (ix) identifying a next consumer from the cleaned consumer call list to call and then awaiting a next initiate call instruction to be received from the respective transfer agent.

In a feature of the first aspect, the computerized system further includes a client database for storing an initial consumer call list. In another feature, the information associated with each of the large group of consumers included in the initial consumer call list is updated upon completion of calling of all of the cell phone numbers from the cleaned consumer call list. In another feature, the information associated with each of the large group of consumers included in the initial consumer call list is updated in the client database based on the results of the call between the respective one consumer and the respective client associate. In yet another feature, the information associated with each of the large group of consumers included in the initial consumer list is updated in the client database based on the results of the call between the respective one consumer and the respective transfer agent. In another feature, the cell phone communication processor performs the additional step of updating the information associated with the respective one consumer in the call center database after dialing the cell phone number of the respective one consumer. In yet a further feature, the origination number of the call between the respective one consumer and the respective client associate is used to obtain information associated with the respective one consumer from the client database and to display said information during the call on the interactive display of the respective work station of the respective client associate.

In another feature of the first aspect, the initial consumer call list is uploaded from the client database to the call center database. In yet a further feature, the cell phone communication processor performs the additional step of converting the initial consumer call list into the cleaned consumer call list. In a further feature, the cell phone communication processor converts the initial consumer call list to the cleaned consumer call list by eliminating any consumer records in which the cell phone number (i) has been converted to a landline number, (ii) is incomplete or has an invalid area code; (iii) is included on a "no call" list; (iv) is identified as a number that always rolls to an answering machine; (v) is identified as a number that is never answered; and (vi) is identified as a duplicate cell phone number used with two or more consumer records.

In a yet further feature, the respective transfer agent provides the initiate call instruction to the cell phone communication processor by clicking on a button displayed on the interactive display of the respective work station of the respective transfer agent.

In another feature, the respective transfer agent provides the initiate call instruction to the cell phone communication processor by disconnecting the connection with the respective one consumer. In yet a further feature, the respective transfer agent remains on the call between the respective one consumer and the respective client associate for a period of time after the call has been transferred to the respective client associate but before disconnecting the connection with the respective one consumer.

In another feature, the respective transfer agent drops off the call between the respective one consumer and the respective client associate immediately upon transferring the call to the respective client associate.

In another feature of the first aspect, the cell phone communication processor only permits a call to be made to the respective one consumer during a permitted time window defined by the TCPA and wherein the respective one consumer is assumed to be in a time zone based on (i) the area code of the cell phone number, (ii) the zip code of the address of the respective one consumer, or (iii) the overlap of both the area code and zip code.

In a further feature, if the cell phone communication processor determines that a live voice is not detected, the cell phone communication processor then determines whether the call has been answered by an answering machine. If the cell phone communication processor determines that the call has been answered by the answering machine, the cell phone communication processor disconnects the call. On the other hand, if the cell phone communication processor determines that the call has not been answered by the answering machine, the cell phone communication processor hangs up the call, updates the information associated with the respective one consumer in the call center database to indicate a disposition of the call, identifies the next consumer from the cleaned consumer call list to call, and then awaits the next initiate call instruction to be received from the respective transfer agent.

In yet a further feature, if the call with the cell phone number is successfully connected to the respective transfer agent but not successfully transferred to the respective client associate, the cell phone communication processor receives an explanation for the failed call transfer from the respective transfer agent, updates the information associated with the respective one consumer in the call center database to indicate the explanation for the failed call transfer, identifies the next consumer from the cleaned consumer call list to call, and then awaits the next initiate call instruction to be received from the respective transfer agent.

In yet a further feature, the cell phone communication processor provides a list on the interactive display of the respective work station of the respective transfer agent from which the respective transfer agent is able to select the explanation for the failed call transfer.

In a second aspect, in a computerized system having a cell phone communication processor, wherein the processor includes non-transitory computer-readable media containing computer-readable instructions which, when executed by the cell phone communication processor, perform a method of efficiently and quickly calling cellular/mobile phones ("cell phones") of a large group of consumers/customers ("consumers") of a client in a manner compliant with the Telephone Consumer Protection Act ("TCPA"), comprising the steps of: (a) uploading an initial consumer call list from the client; (b) converting the initial consumer call list into a cleaned consumer call list, wherein the cleaned consumer call list contains information associated with each of the large group of consumers of the client and wherein the information includes the name, client account number, and cell phone number of each respective consumer; (c) storing the cleaned consumer call list in a call center database, the cell phone communication processor in electronic communication with the call center database; (d) retrieving a cell phone number of a respective one consumer from the cleaned consumer call list; (e) receiving an initiate call instruction from a respective transfer agent to initiate a call to the respective one consumer, wherein the respective transfer agent operates a call center workstation in electronic communication with the cell phone communication processor; (f) in response to the initiate call instruction received from the respective transfer agent, dialing the cell phone number of the respective one consumer; (g) determining if a live voice is detected when the call is answered by a recipient of the call and, if so, connecting the call to the respective transfer agent; (h) displaying the information associated with the respective one consumer on an interactive display of the call center work station of the respective transfer agent; (i) thereafter, receiving a transfer call instruction from the respective transfer agent to transfer the call to a client workstation of a respective client associate; (j) in response to the transfer call instruction, transferring the call to the respective client associate and providing the cell phone number of the respective one consumer as the origination number of the call; (k) after the call has been successfully transferred and a connection established between the respective one consumer and the respective client associate, disconnecting the connection between the respective one consumer and the respective transfer agent; (l) identifying a next consumer from the cleaned consumer call list to call; and then (m) awaiting a next initiate call instruction to be received from the respective transfer agent.

In a feature of the second aspect, updating the information associated with each of the large group of consumers included in the initial consumer call list upon completion of calling of all of the cell phone numbers from the cleaned consumer call list. In another feature, updating in the client database the information associated with each of the large group of consumers included in the initial consumer call list based on the results of the call between the respective one consumer and the respective client associate. In yet another feature, updating in the client database the information associated with each of the large group of consumers included in the initial consumer list based on the results of the call between the respective one consumer and the respective transfer agent. In another feature, the cell phone communication processor performs the additional steps of updating the information associated with the respective one consumer in the call center database after dialing the cell phone number of the respective one consumer. In yet a further feature, providing the origination number of the respective one consumer to the respective client associate to enable the respective client associate to obtain information associated with the respective one consumer and to enable display of said information during the call on an interactive display of the respective work station of the respective client associate.

In another feature of the second aspect, the cell phone communication processor performs the step of converting the initial consumer call list into the cleaned consumer call list by eliminating any consumer records in which the cell phone number (i) has been converted to a landline number, (ii) is incomplete or has an invalid area code; (iii) is included on a "no call" list; (iv) is identified as a number that always rolls to an answering machine; (v) is identified as a number that is never answered; and (vi) is identified as a duplicate cell phone number used with two or more consumer records.

In a yet further feature, receiving the initiate call instruction when the respective transfer agent clicks on a button displayed on the interactive display of the respective work station of the respective transfer agent.

In another feature, receiving the initiate call instruction when the respective transfer agent disconnects the connection with the respective one consumer. In yet a further feature, the respective transfer agent remains on the call between the respective one consumer and the respective client associate for a period of time after the call has been transferred to the respective client associate but before disconnecting the connection with the respective one consumer.

In another feature, the respective transfer agent drops off the call between the respective one consumer and the respective client associate immediately upon transferring the call to the respective client associate.

In another feature of the second aspect, further comprising the step of only permitting a call to be made to the respective one consumer during a permitted time window defined by the TCPA and wherein the respective one consumer is assumed to be in a time zone based on (i) the area code of the cell phone number, (ii) the zip code of the address of the respective one consumer, or (iii) the overlap of both the area code and zip code.

In a further feature, if the cell phone communication processor determines that a live voice is not detected, the cell phone communication processor then determines whether the call has been answered by an answering machine. If the cell phone communication processor determines that the call has been answered by the answering machine, the cell phone communication processor disconnects the call. On the other hand, if the cell phone communication processor determines that the call has not been answered by the answering machine, the cell phone communication processor hangs up the call, updates the information associated with the respective one consumer in the call center database to indicate a disposition of the call, identifies the next consumer from the cleaned consumer call list to call, and then awaits the next initiate call instruction to be received from the respective transfer agent.

In yet a further feature, if the call with the cell phone number is successfully connected to the respective transfer agent but not successfully transferred to the respective client associate, the cell phone communication processor receives an explanation for the failed call transfer from the respective transfer agent, updates the information associated with the respective one consumer in the call center database to indicate the explanation for the failed call transfer, identifies the next consumer from the cleaned consumer call list to call, and then awaits the next initiate call instruction to be received from the respective transfer agent.

In yet a further feature, providing a list on the interactive display of the respective work station of the respective transfer agent from which the respective transfer agent is able to select the explanation for the failed call transfer.

The aspects of the invention also encompass a computer-readable medium having computer-executable instructions for performing methods of the present invention, and computer networks and other systems that implement the methods of the present invention.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein:

FIG. 9 is an exemplary screen shot with a list of campaigns (call lists) provided by the client associated with the system of FIG. 1;

FIGS. 12-16 are several exemplary client reports that present results of any specific consumer calling campaign associated with the system of FIG. 1.

DETAILED DESCRIPTION OF EMBODIMENTS OF THE INVENTIONS DISCLOSED HEREIN

Figure 1:
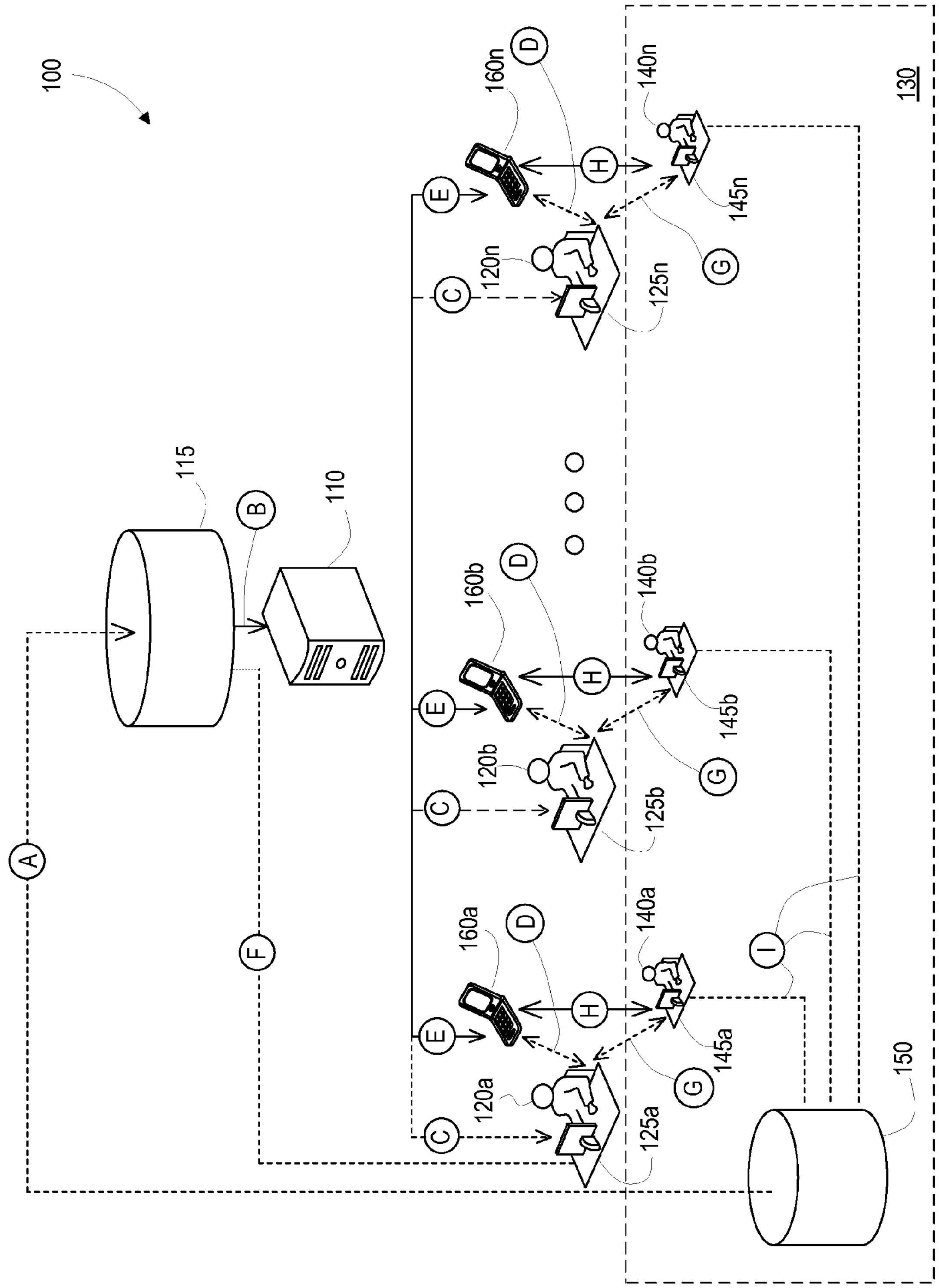
FIG. 1 is a system diagram illustrating a preferred embodiment of the present inventions.

Before the present methods and systems are disclosed and described in greater detail hereinafter, it is to be understood that the methods and systems are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutations of these can not the explicitly disclosed, each is specifically contemplated and described herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices.

Embodiments of the methods and systems are described below with reference to block diagrams and flowchart illustrations of methods, systems, apparatuses and computer program products. It will be understood that each block of the block diagrams and flow illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Turning now to FIG. 1, an overview of a preferred system embodiment 100 of the present invention is illustrated. In a typical arrangement, the system 100 includes a main cell phone communication processor 110 in electronic communication with a cell phone management and reporting database 115. The call center personnel include a plurality of transfer agents 120*a*, 120*b*, . . . , 120*n*, each working at a respective transfer agent workstation 125*a*, 125*b*, . . . , 125*n*, which are each in electronic communication with the main cell phone communication processor 110. The client 130 includes a plurality of client associates 140*a*, 140*b*, . . . , 140*n*, each working at a respective client associate workstation 145*a*, 145*b*, . . . , 145*n*, which are each in electronic communication with one or more client management processors (not shown) and with a client database 150. Finally, the system 100 contemplates and includes a plurality of consumer cell phones 160*a*, 160*b*, . . . , 160*n*, each belonging to a respective consumer of the client 130. The purpose of this system 100 is to enable the client 130 to contact a large number of its consumers on their respective cell phones 160*a*, 160*b*, . . . , 160*n*, in an efficient and cost-effective manner and in such a way to remain in compliance with the TCPA. The use of the main cell phone communication processor 110, the cell phone management and reporting database 115, and the plurality of transfer agents 120*a*, 120*b*, . . . , 120*n*, each working at their respective transfer agent workstations 125*a*, 125*b*, . . . , 125*n* enables this to occur.

Procedurally, still referring to FIG. 1, at Step A (shown as a letter "A" in a circle), raw consumer data is uploaded or imported from consumer database 150 to the cell phone management and reporting database 115. Preferably, this raw consumer data includes at least the minimum information necessary to identify each consumer, including their contact name, account number, and last known cell phone number. Additional information can be helpful, such as consumer address, social security number or last four digits of the social security number, account balance or other relevant account information (due date, past due amount, etc.), credit score, and the like, but is not required. Because this system 100 is designed specifically for compliance with the TCPA for calls to cell phone numbers, the raw consumer data does not need to include any consumers for which a landline number is available. Such consumers can be contacted using other systems, which are beyond the scope of this invention and disclosure.

Once this raw consumer data has been imported, at Step B, such raw consumer data is analyzed and scrubbed using a Wireless Number Identification Service (WNIS) process, which is described in greater detail hereinafter in association with FIG. 7. This WNIS process utilizes the most current list available of phone numbers assigned to wireless providers and also checks numbers against the most current "Wireless Block Identifier" list automatically to delete any consumers having a number that is no longer identified as a cell number or that has been included on the national "No Call" list. The WNIS process, thus, converts the consumer raw data into three categories of data: (i) a usable list of consumers having valid cell phone numbers that are available for further processing by the system 100; (ii) a list of consumers having a land line number that can be processed using a separate land line calling system; and (iii) a list of consumers who do not appear to have a valid cell phone or land line number or who have requested not to be contacted by cell phone. Such one or more categories of data can be provided immediately back to the consumer 130 for further processing and handling of consumers falling into the (ii) or (iii) categories or such data can be recorded and provided back to the consumer at the end of a calling campaign to consumers falling into category (i).

At Step C, the usable list of consumers having valid cell phone numbers (category (i)) is sorted into sequential order, by cell phone number of the consumer, and one number (and corresponding data record of available information about that corresponding consumer) is made available to each respective transfer agent 120 who is ready and available to make a call. The number and consumer information are made available on the display screen of the respective workstation 125.

At Step D, each respective transfer agent 120 initiates dialing of the current consumer cell phone number by interacting with the display screen of his respective workstation 125. At Step E, the main cell phone communication processor 110 effectively and quickly detects operator intercepts, answering machines, and other non-productive call types and hangs up the non-productive call, while at the same time providing a status or basis for the hang up (or disconnection) back to the cell phone management and reporting database 115, at Step F, which updates the respective consumer record to reflect the attempted call and basis for failed communication of such call. As will be explained hereinafter, it is important to understand that: (a) each respective transfer agent 120 initiates dialing of the call to a specific consumer cell phone number, (b) the cell phone numbers are not generated randomly or sequentially from all possible combinations of numbers, but are taken directly from the database of known and verified cell phone numbers of legitimate consumers or customers of the client, (c) the system 100 does not use software or technology or algorithms to predict transfer agent availability, but rather only provides a transfer agent with a single consumer cell phone number for dialing upon completion/resolution of a prior call; (d) the transfer agent is only given and permitted to call one consumer cell number as a time—the transfer agent is not able to engage two or more consumer phone lines simultaneously; (e) neither the transfer agent nor the system itself are permitted to leave an artificial or prerecorded message in the consumer's voice mail if the consumer does not answer; and (f) all calls and call attempts with consumer cell phone numbers can be recorded are stored in association with the respective consumer record for auditing and TCPA-compliance purposes. Finally, but no less importantly, the caller-ID or ANI that does get provided to the consumer's cell phone, whether or not the call is answered, can be configured or customized by the client. Such configuration can be based on any of a number of factors, such as time or date of the call, the area code of the consumer's cell phone number, the reason for the call, and the like. This caller ID or ANI allows the consumer to see that they have missed a call (or provides them with a call back number if the cell phone call gets dropped or disconnected for any reason). This caller ID can be a call back number to the call center/transfer agent or directly to a client associate. In either case, providing such number increases the likelihood that a consumer who is not reached on a first attempt voluntarily calls back on their own initiative.

At Step D, if the transfer agent successfully connects with a live voice/person, they use the category (i) information provided in the consumer import file to verify that they are speaking with the "Right Party." In other words, they verify that the speaker on the cell phone matches the consumer name and corresponding account number provided for that consumer. A standard script or protocol may be developed and used by the transfer agent for this verification process, as desired by the client.

When the Right Party is verified, the transfer agent 120 then transfers the call with the consumer, at Step G, to an available client associate 140, based upon call transfer procedures defined during the implementation process between the call center and the client.

At Step H, the transfer agent 120 "hands off the call" to the client associate 140 and disconnects from the call, based upon the call transfer procedure defined during the implementation process. This hand off can either be a "warm" hand off in which the transfer agent stays of the 3-way conference call until a suitable introduction and hand off has been made to introduce the consumer to the client associate. Alternatively, this hand off can be a "cold" hand off in which the transfer agent merely explains in advance to the consumer that he will now be connected directly with a client associate or representative of the client to discuss information about the identified account of the consumer. As part of the hand off process, the caller ID of the consumer's cell phone is provided to the client associate 140 so that, using suitable and readily available software installed on the client associate's workstation 145, information about the consumer and the consumer's account can be pulled up and displayed in real time to the client associate so that the purpose of the call can be explained and handled.

As shown by Steps F and I, the entire call sequence and disposition can be recorded and stored for reporting purposes. Such recording can be maintained in the cell phone management and reporting database 115, the client database 150, or both. Or, in some embodiments, portions of the call with the consumer involving the call center and transfer agent can be kept only in the cell phone management and reporting database 115 and the portion of the call with the consumer and associated with the client associate can be stored only in the client database 150.

As will be appreciated by those skilled in the art, the present system 100 preferably uses ISDN and SIP outbound calling trunks. By using such circuits, many calls can be immediately and quickly determined to be "bad" numbers. The system 100 is then able to dial another consumer number for the waiting transfer agent immediately.

As stated previously, at Step E above, the main cell phone communication processor 110 effectively and quickly detects operator intercepts, answering machines, and other non-productive call types and hangs up the non-productive call, while at the same time providing a status or basis for the hang up (or disconnection) back to the cell phone management and reporting database 115. The system 100 is able to effectively and quickly detect operator intercepts, answering machines, and other non-productive call types using the telephony cards associated with the ISDN and SIP outbound calling trunks. Preferably, the system 100 uses telephone cards available from Dialogic Corp. The cards consist of voice resource and conference cards. The voice resource cards are connected to ISDN spans connected to a telephony service provider. The conference cards are not connected externally but can conference one or more parties. Specific voice resource Dialogic cards preferably used by the system include those designated by serial numbers: D240SC-T1, D240JCT-T1, D480SC-T1 and/or D480JCT-2T1. These boards perform call progress analysis using two software algorithms used to detect live talkers and answering machines. Such algorithms include: (i) PVD—Positive Voice Detection™ and (ii) PAMD—Positive Answering Machine Detection™.

The Positive Voice Detection (PVD)™ feature, under host control, provides energy detection on a selected channel. The following parameter, such as time constant, dB level, and sensitivity settings, can be configured and are defined by the energy detection receiver. The energy detection receiver makes no distinction between a recorded voice, a live voice or any noise. The PVD feature informs the host application when it detects the following: (i) energy/noise (rising edge), (ii) energy/noise is removed (falling edge) with the duration of the noise (in the data of the falling edge), and (iii) silence.

The PVD takes the signal output of the energy block and computes a long-term estimate of the background noise based on the statistics of the signal. Signals are reported as positive voice when the short-term energy measurement exceeds the long-term noise by the specified API programmable noise margin. The PVD brackets individual words with detection events.

The Positive Answering Machine Detection (PAMD)™ feature includes a DSP algorithm that accurately discriminates human speech from recorded human voice (i.e., an answering machine).

Figure 2:
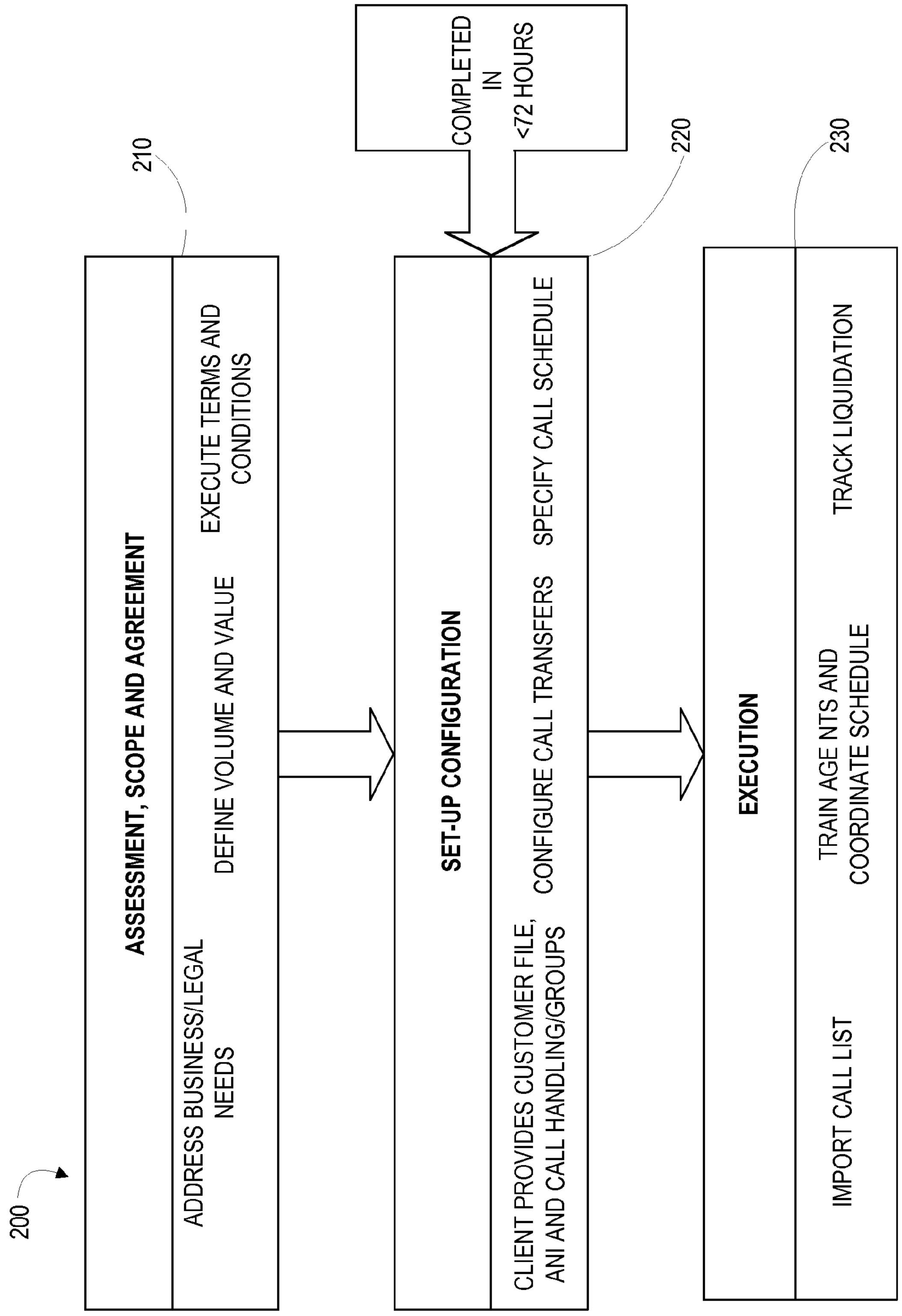
FIG. 2 is a high level flow chart illustrating the set up and configuration process associated with the system of FIG. 1.

Turning now to FIG. 2, a high level process 200 for establishing the working protocols and relationship between the client 130 and the call center is illustrated. The initial step 210 calls for the call center's assessment of the needs of the client, defining and determining the volume and scope of the number of calls that need to be made to consumers of the client, and formalizing the legal relationship between the two parties. In step 220, the parties work through the details of the file transfer to confirm the data that will be included in the raw consumer data to be provided by the client to the call center, confirm the script and procedure that will be used to handle call transfers between the call center's transfer agents and the client's associates, and confirm the date schedule and time window(s) that will be used by both parties for attempting to reach the client's consumers. Step 230 illustrates the substantive or execution process performed by the system 100, which includes initial importation/uploading of the client's consumer list, ensuring that all resources (transfer agents and client associates) are trained and coordinated on the project schedule prior to initiation and during implementation of the project, and, after completion of the project, reporting and analyzing the results of the project.

Figure 3:
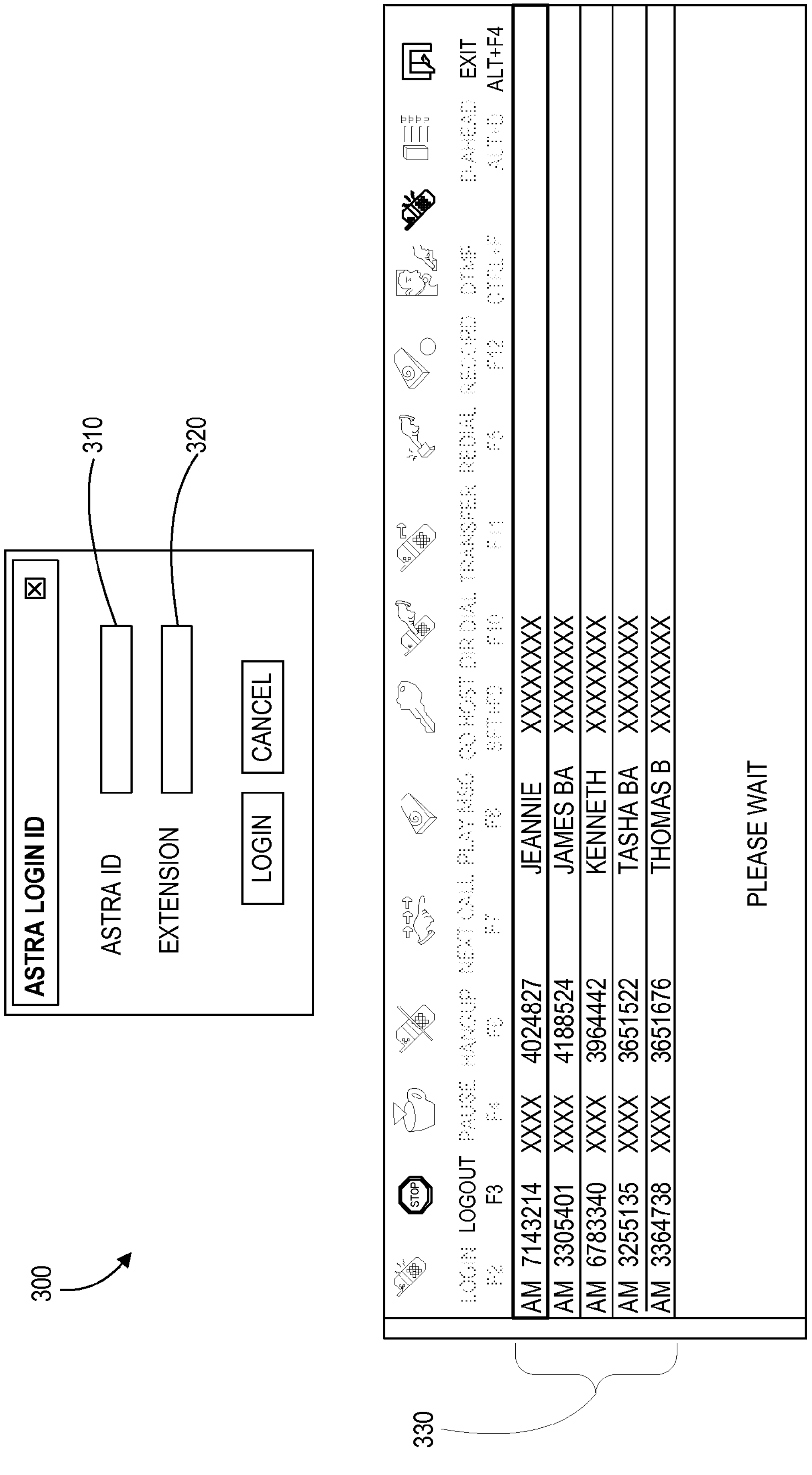
FIG. 3 is an exemplary transfer agent login screen associated with the system of FIG. 1.

FIG. 3 illustrates an exemplary transfer agent login dialog screen and waiting screen 300. The transfer agent logs into the system 100 in conventional manner, by filling in their assigned user name in field 310 and the extension of the phone for their workstation in field 320. While the transfer agent is waiting, the last five consumer contacts are displayed in the main dialing window 330. Full names and numbers have been redacted for privacy reasons.

Figure 4A:
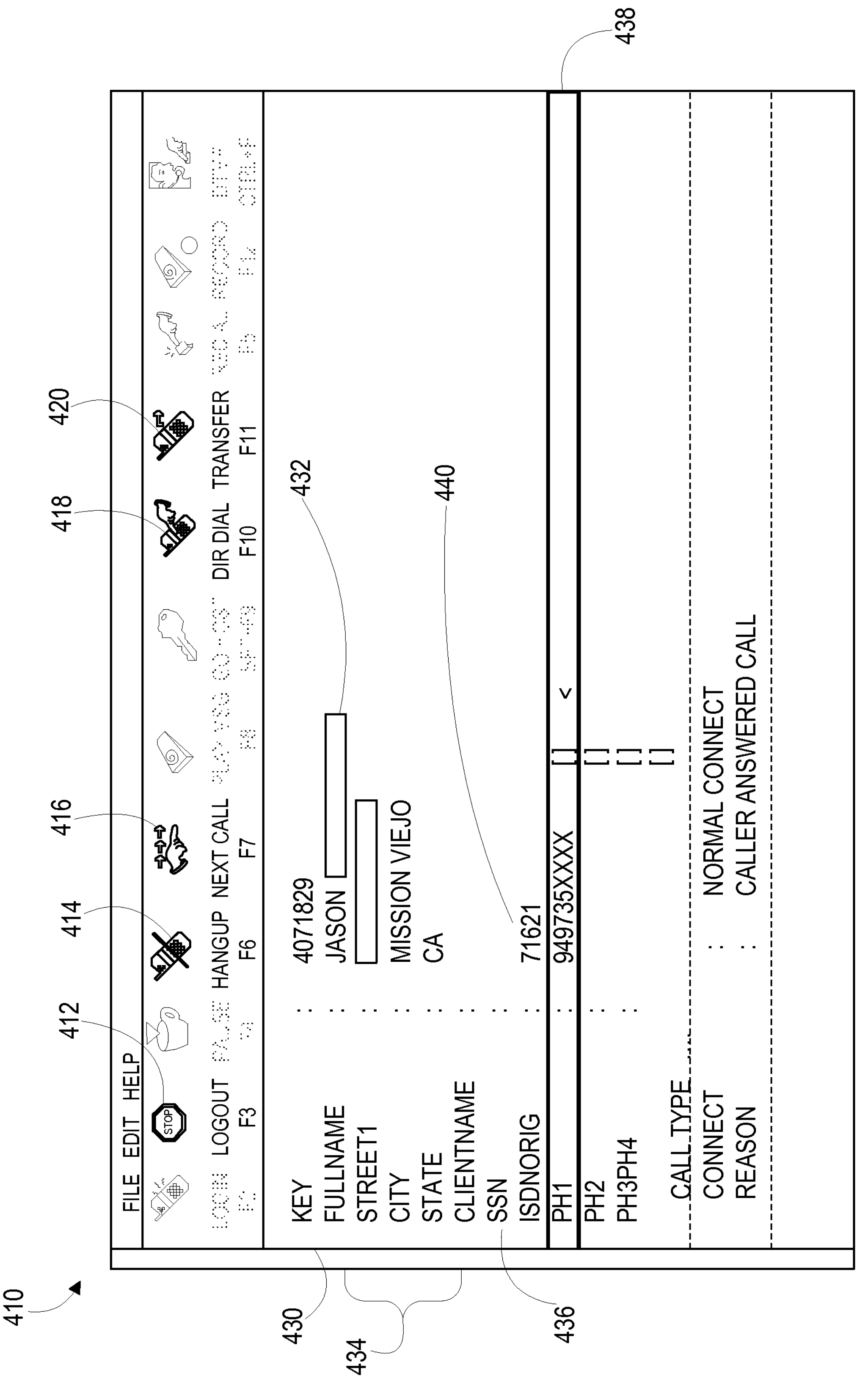
FIG. 4A-4B are exemplary transfer agent consumer contact windows associated with the system of FIG. 1.
Figure 4B:
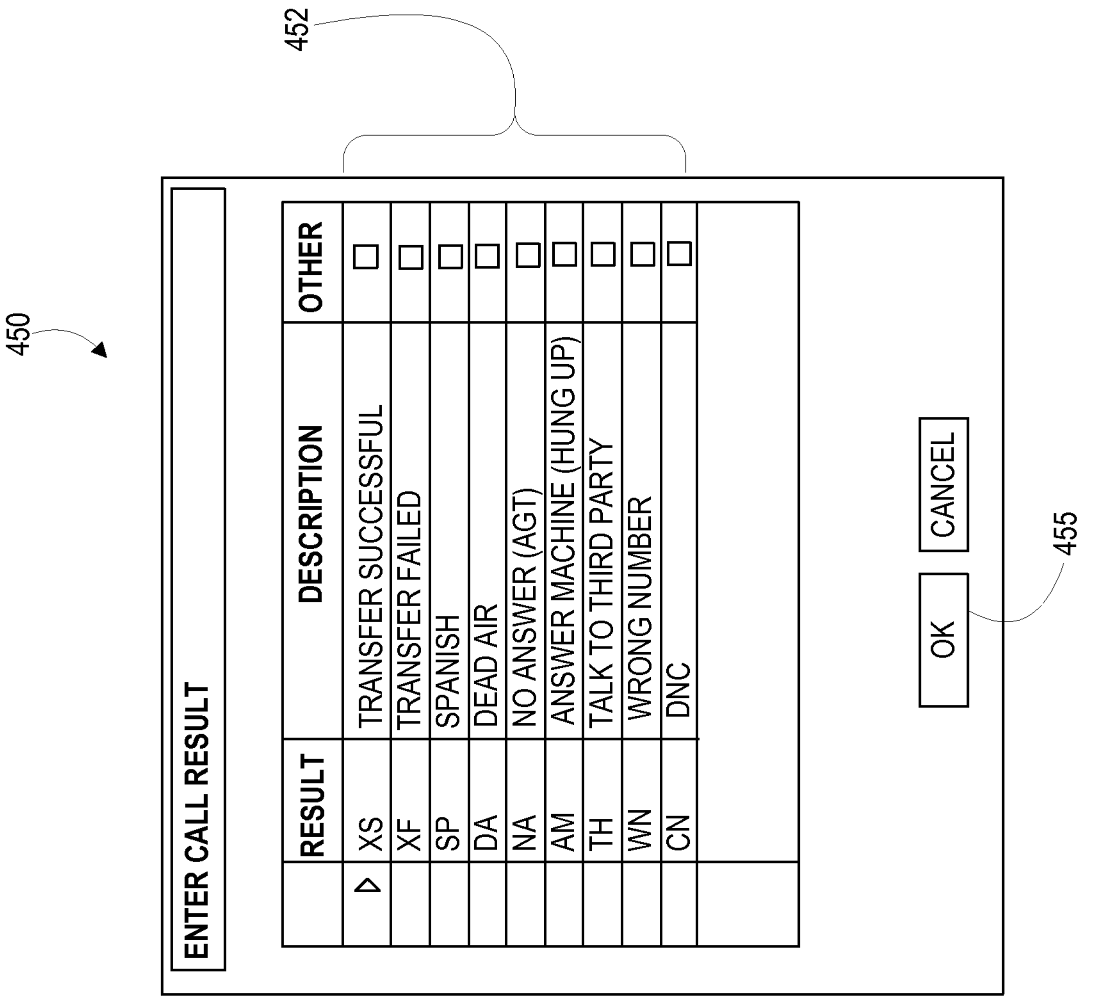

FIGS. 4A and 4B illustrate an exemplary "pop" screen 410 and dialog box 450 used by a transfer agent when making a call to a consumer. The "pop" screen 410 includes a logout button 412 (which enables the transfer agent to log out of the system 100), a hang-up button 414 (which allows the transfer agent to hang up an in-progress call with a consumer), a next call button 416 (which allows the transfer agent to initiate a new call with the next consumer in the call list), a direct dial button 418 (which is a back-up process to enable the transfer agent to manually enter a consumer's cell number), and a transfer call button 420 (which enables the transfer agent to initiate a transfer of an on-going call with a consumer to an available client associate assigned to receive calls as part of the current project). The agent "pop" screen 410 contains whatever information (associated with each consumer) that the client wants displayed to enable the transfer agent to verify that the "Right Party" has been contacted. In this example shown, the consumer account number (key) 430, name 432, address 434, social security number (or last four digits of the consumer's social security number) 436, and cell phone number 438 are displayed. The row labeled "ISDN-ORIG" 440 is the phone number that is displayed on the caller ID of the called cell phone. The next call dialog box 450 allows the transfer agent to choose the result of the call (e.g., transfer succeeded, transfer failed, consumer hung up, dead air, no answer, cell call dropped, call answered but only spoke with 3$^{rd}$ party not identified as the Right Party, wrong number, language barrier (person answering the call did not speak the same language as the transfer agent). Once a box 452 is checked, the transfer agent selects the OK button 455 to record the result of the call in database 115 and initiate a new call to the next consumer on the call list.

Figure 5:
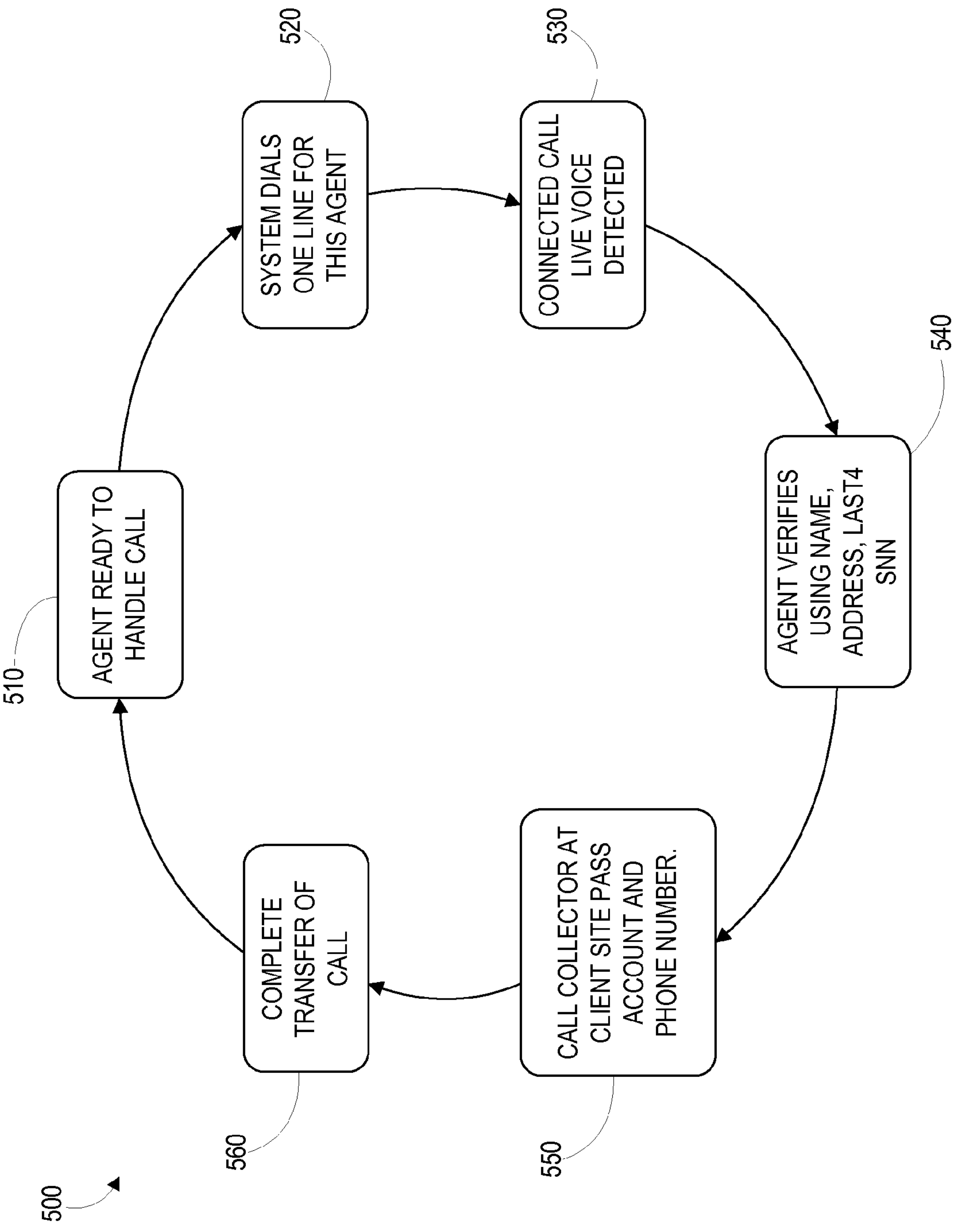
FIG. 5 is a high level flow chart illustrating the basic transfer agent call handling cycle associated with the system of FIG. 1.

FIG. 5 illustrates the basic steps 500 performed by a transfer agent as part of a successful call handling cycle. At step 510, the transfer agent is ready to initiate a call to one of the client's consumers. At step 520, the system dials one of the client's consumers on one outgoing phone line for this transfer agent. At step 530, the system connects the call between the transfer agent and the consumer when a live voice is detected. At step 540, the transfer agent verifies that the person answering the call is the "Right Party," using name address, account number, and/or social security number (or last four digits of the consumer's social security number). At step 550, once the consumer has been identified as the "Right Party," the transfer agent transfers the call to an available or specifically designated client associate—providing at least the cell number of the consumer as part of the transfer process. Preferably, the cell number is provided as the caller ID coming from the transfer agent to the client associate. Other information, such as the consumer's name, address, account number, and/or social security number (or last four digits of the consumer's social security number) can also be provided from the transfer agent to the client associate. At step 560, after the transfer agent has successfully transferred the call to the client associate, the call is completed, the successful transfer is recorded in database 115, and the transfer agent is ready to handle a new call, which returns the process to step 510.

Figure 6:
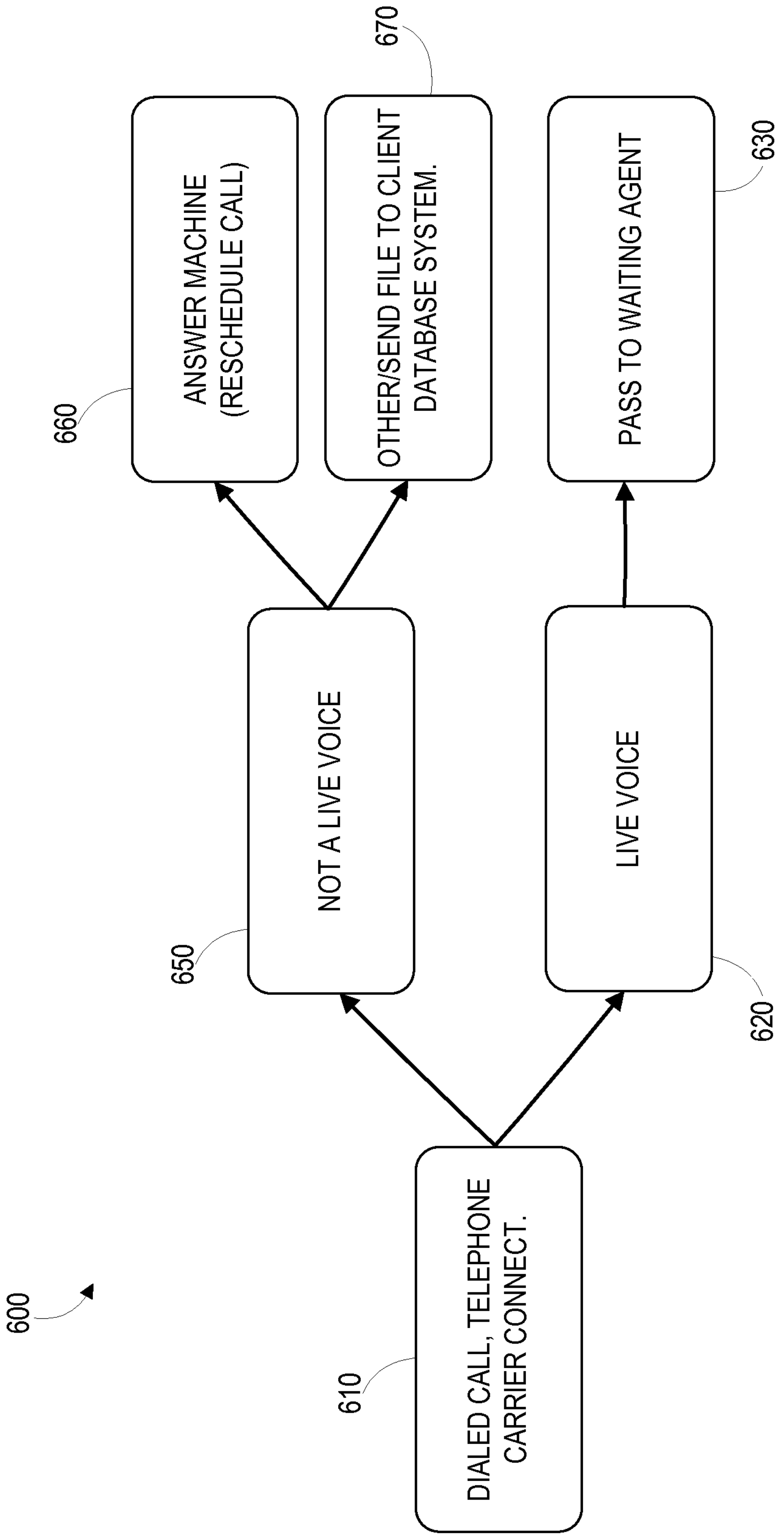
FIG. 6 is a decision tree illustrating how calls are handled by the system of FIG. 1.

FIG. 6 illustrates the process 600 by which the system handles a connected call when a live or non-live voice is detected. At step 610, once a consumer phone number is dialed and a long distance carrier connects the system with the designated cell phone number, the system needs to analyze the answer received and make a routing decision. If a live voice is detected at step 620, the system connects the call to a waiting transfer agent at step 630. If a live voice is not detected (i.e., if the call type is not a "live voice") at step 650, the system then determines whether the call has been answered by an answering machine or not. If the call is answered by an answering machine (or voice mail) at step 660, the system automatically hangs up and schedules a follow-up call for later (unless a call-back option is not desired by the client during the initial set-up/implementation process). If the call is not answered by an answering machine (e.g., disconnect, fax machine, dead air, dropped call, etc.) at step 670, then the system hangs up the call and annotates the client record for reporting back to the client. If desired, the client can specify that consumers falling into a call not answered by an answering machine (e.g., disconnect, fax machine, dead air, dropped call, etc.) at step 670 be scheduled for a follow-up call for later.

Figure 7:
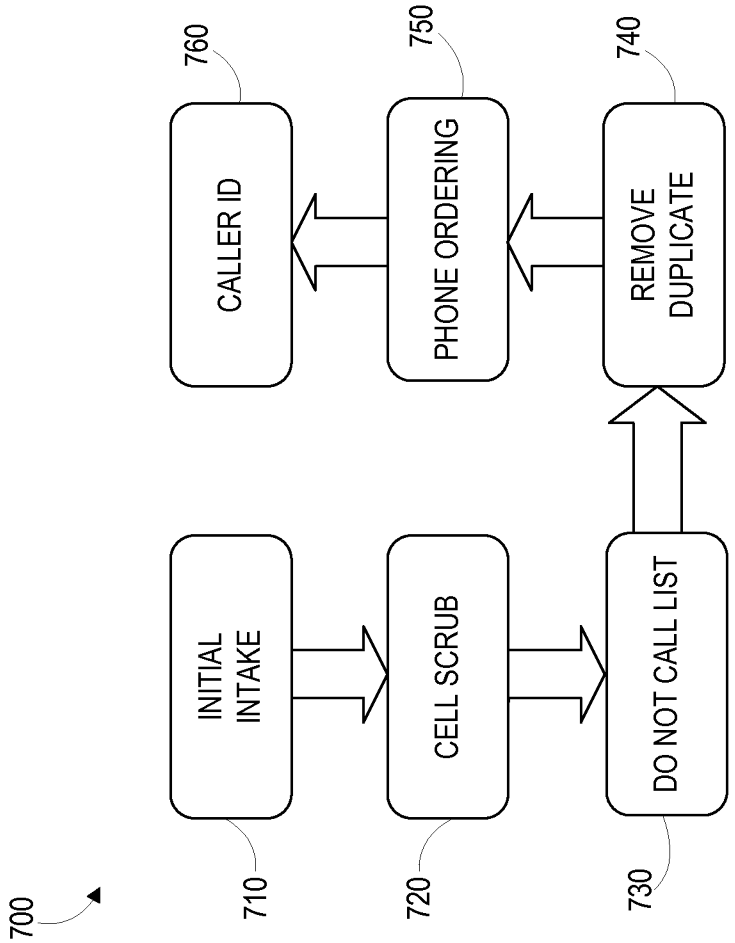
FIG. 7 is a high level flow chart illustrating the process for analyzing and scrubbing a client's initial consumer cell phone call list used with the system of FIG. 1.

FIG. 7 illustrates in more detail how raw consumer data is analyzed and scrubbed by the system using the Wireless Number Identification Service (WNIS) process 700, shown as Step B from FIG. 1. At step 710, the raw consumer call list data is uploaded or imported to the system 100. As part of the initial intake, any records without phone numbers and other obvious restrictions (such as emergency numbers, invalid area code/exchanges, and the like) are removed from the initial consumer call list. At step 720, the consumer call list is analyzed to confirm that all consumer numbers are valid cell numbers. This is accomplished by comparing each phone number against a database of non-ported cell phone number blocks and comparing each phone number against a database of ported cell phone numbers. At step 730, the updated consumer call list is compared with the database of consumers who have requested not to be called on their cell phone number. Such numbers are removed from the current consumer call list. In addition, numbers identified as perpetual answering machine numbers or no answer numbers are also removed from the current consumer call list. At step 740, the system removes any duplicate entries from the consumer call list based on duplicate account numbers or duplicate cell phone numbers. At optional step 750, ordering of the consumer call list can be arranged based on consumer name, account number, or cell phone number, or other consumer data requested by the client. Finally, at step 760, the system allows the client to specify the caller ID that will be displayed to the outbound caller/consumer.

More specifically, steps 720 and 730 include use of the Wireless Number Identification Service (WNIS) process to identify and manage wireless phone numbers. This process utilizes the most current list available of phone numbers assigned to wireless providers, the "Wireless Block Identifier, " to automatically scrub consumer call lists of any non-cell phone numbers. The Wireless Block Identifier file identifies those area codes and exchanges or blocks of numbers assigned to wireless carriers active within the North American Numbering Plan in the U.S. and Canada. An updated file is made available twice monthly for download and covers over 500,000 blocks representing some 500 million plus phone numbers that are currently assigned or will be assigned to wireless devices. A replacement Wireless Block Identifier file is created twice a month and is automatically downloaded and used by the system to ensure that the consumer's cell phone call list is as accurate as possible.

In addition to the Wireless Block Identifier file, the "Ported Numbers File" is used to identify phone numbers converted from a landline to a wireless number and vice versa. The Ported Number File provides information needed to identify: (i) numbers that appear to belong to wired land lines, but are now assigned to wireless telephones and (ii) numbers that appear to belong to wireless telephones but are now assigned to wired land lines. This information is available, for a fee, from Interactive Marketing Solutions (IMS), and is available at the following website address: https://www.ims-dm.com/productsAVirelessPortedNumbers.shtml. Typically, a replacement Ported Number File is created daily and the system will automatically download the new file from the IMS web site to ensure that the consumer's cell phone call list is as accurate as possible.

In order to comply with the safe time calling requirement of the TCPA, the system only permits calling to specific cell phone numbers during permitted time based on the area code of the cell phone number and the zip code of the consumer's address. Specifically, given the trend of consumers to keep existing cell phone numbers regardless of where they live or move to, it has been deemed prudent to verify the time zone of the record address of the consumer with the zip code of the area code/exchange of the phone number. This is accomplished by acquiring and maintaining a database of time zones for every area code/exchange and zip code, which is commercially available from several companies (e.g. www.area-codes.com). A database is also acquired and maintained of all known cell phone blocks reserved by carriers and ported telephone numbers from commercial $3^{rd}$ party, as discussed previously with regard to IMS (e.g. www.ims-db-.com). Next, the system verifies that each phone number received from the client's consumer data list is a cell phone. Then the system verifies the zip code of the address associated with each consumer/cell phone from the consumer call list. Next, the system performs a look up of time zones associated with each consumer's cell phone area code and address zip code. If the time zones are the same, then the system assumes that the consumer lives in that time zone and can be contacted during TCPA-permitted hours for that time zone. If the time zones are different, then the two windows of TCPA-permitted hours for each time zone are compared and only the overlapping time window for the two time zones that both fall within the TCPA-permitted hours are assigned to that consumer record.

Figure 8:
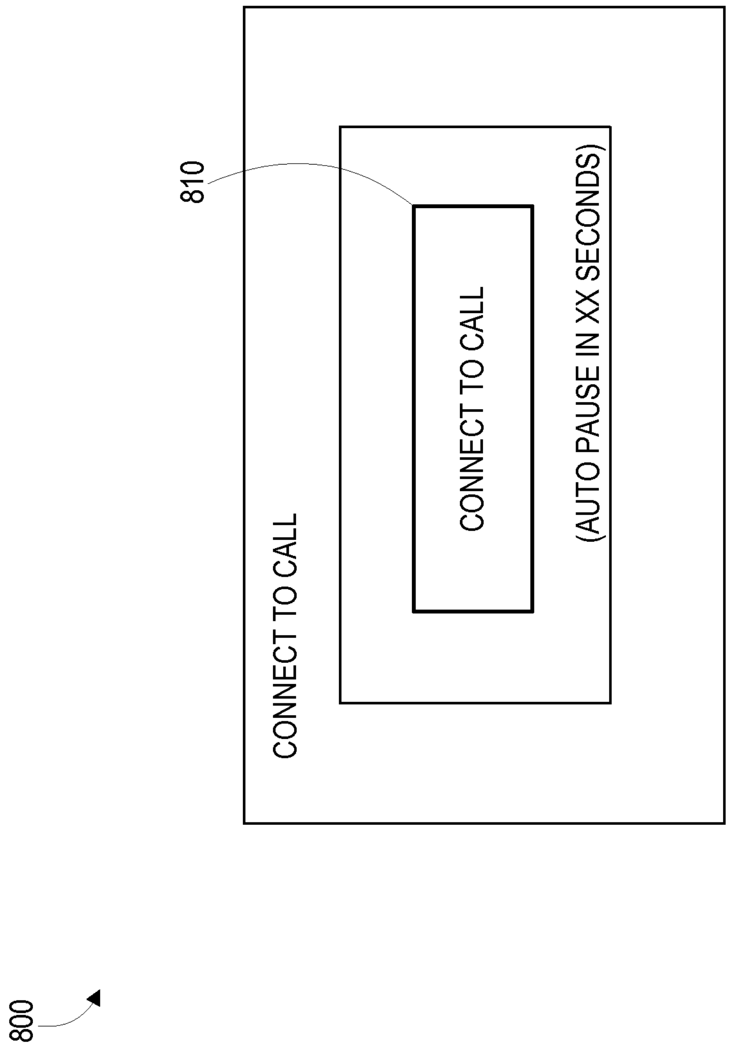
FIG. 8 is an exemplary transfer agent "connect to call" screen associated with the system of FIG. 1.

FIG. 8 illustrates the call to connect dialog box 800 and corresponding connect to call button 810 that must be proactively selected or "clicked on" by the transfer agent before a new call can be initiated with the next consumer on the consumer call list.

Transfer ANI: preferably, the system provides the consumer's cell phone number as the caller ID or origination number when the transfer agent is transferring a call to one of the client's associates for further handling of the call. This is useful for transferring into a PBX or other telephony equipment that can route the call to get to the optimal transferee in the client organization. In addition, even though a transfer agent can verbally provide information about a consumer as part of the transfer/hand off to the client associate, it can save considerable time by automatically providing the consumer's cell number as the originating number, which either allows the client associate to use the number to pull up data or information about the consumer or, with suitable third party software, such originating number can be used automatically to retrieve and present information about the consumer to the client associate.

Localized ANI: preferably, when a transfer agent is calling a consumer on the consumer list, the system displays a local ANI/origination number as the caller ID. In other words, it is generally desirable for a consumer to receive a call that appears to be from the same area code or region of the country as the consumer's own cell phone number. This will provide the consumer with a local number to call back on. To accomplish this, clients must obtain and provide the system with the desired, local call back number to be displayed to each consumer on the cell phone call list. A single number may be provided for such caller ID for all consumers on the call list; a specific number may be provided for different subset of numbers on the call list; or a specific number may be provided for each consumer number on the call list, as desired by the client.

The system provides for returning a file with the results of each call campaign back to the client. For example, FIG. 9 illustrates a screen shot 900 with a list of campaigns (call lists) provided by the client. Once the operations group of transfer agents assigned to a specific campaign have completed calling all valid consumer cell numbers on the consumer call list, the system enables the call center or the client to choose the campaign(s) to create a report file for upload.

Figure 10:
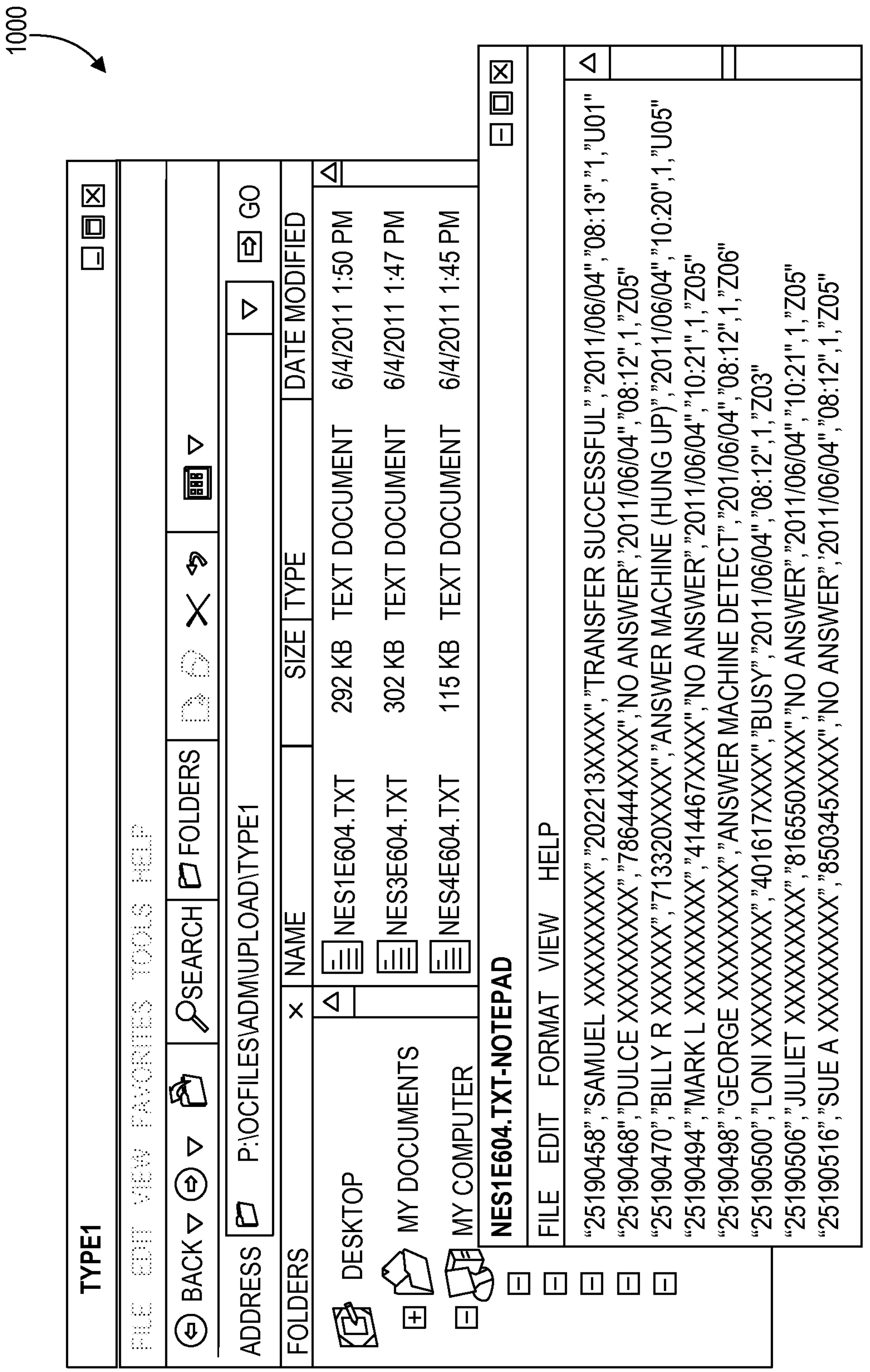
FIG. 10 is an exemplary upload file in a format as requested the client in accordance with the selections made available from the screen shot of FIG. 9.

FIG. 10 illustrates an exemplary upload file 1000 in a format as requested the client. As shown, this client has requested a fairly typical set of fields to return (date/time, account number, phone number, result, etc. . . . ). The format and content provided in any given report is adjustable by the client. In addition, the client will typically import this file into their own database system for further annotation and analysis.

Figure 11:
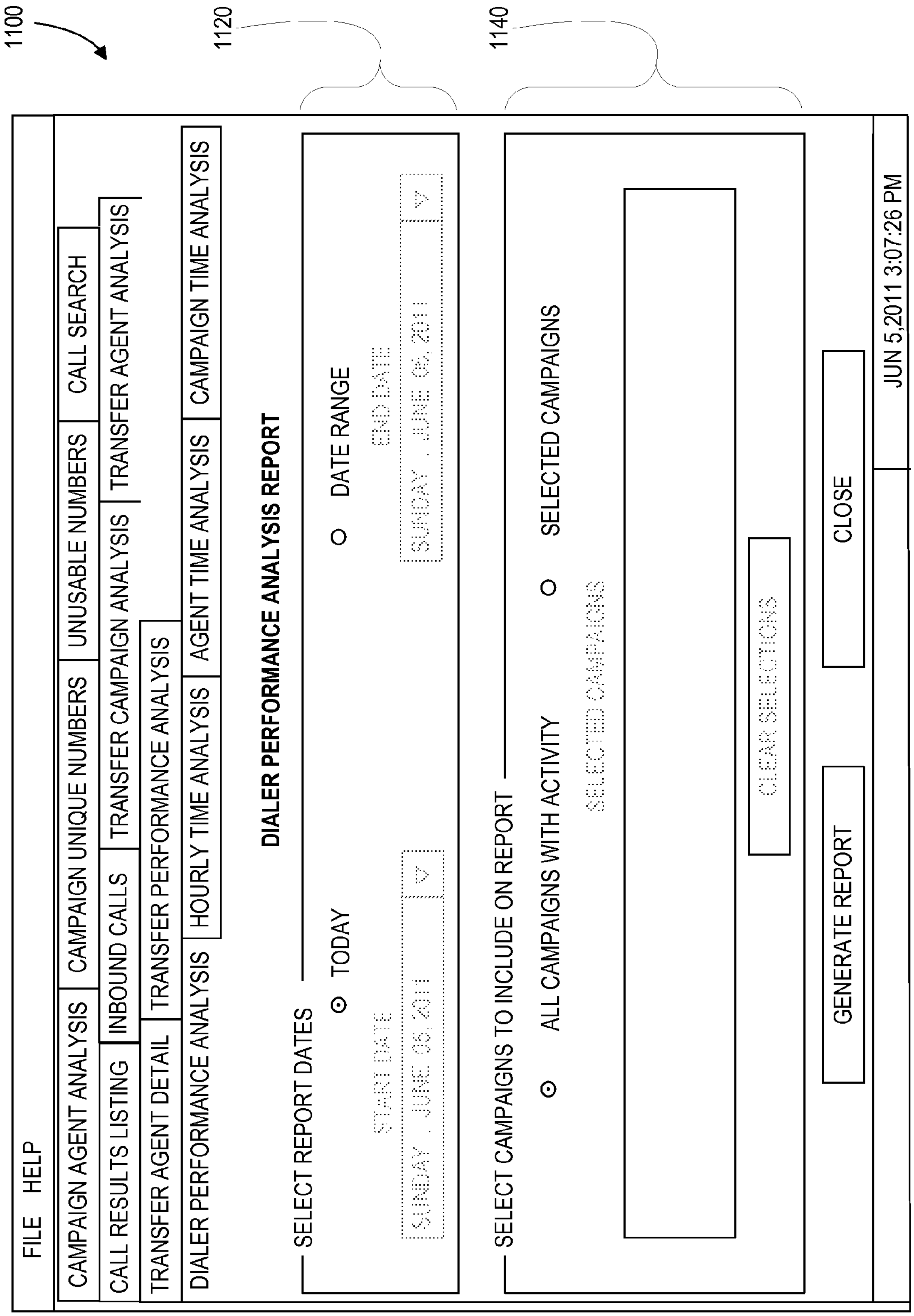
FIG. 11 is an initial, exemplary report creation screen provided to the client associated with the system of FIG. 1.

FIG. 11 illustrates an initial, exemplary report creation screen 1100 that can be displayed to the client for use in generating a report after a consumer calling campaign has been completed or while a campaign is still in the process of being completed. There are numerous reports available, such as agent-, transfer-, time-, or result-oriented. Some key features in this screen 1120 allow specification of date or range of dates. The bottom section 1140 allows for selecting one or more call list to include in the report.

The following figures, FIGS. 12-16, illustrate several exemplary client reports that can be generated by the system to present results of any specific consumer calling campaign. FIG. 12 illustrates a Transfer Campaign Analysis Report 1200. As shown, this specific campaign was for one day, and just for one campaign. Columns (Month/Day, Hours, Number of Dials, Connects, Calls passed to a Transfer Agent, Live Connects, % of Live Connects, Right Party Confirmed (RPC), % RPC, Calls Passed to Client Associate, % of Calls Passed to Client Associate, and Number of Successful Call Transfers Per Hour) are all self-explanatory. In addition, as will be appreciated by those skilled in the art, such report can easily be exported to various database or presentation formats, such as Microsoft Excel, Microsoft Access, Adobe Acrobat, and the like. FIG. 13 illustrates a Transfer Campaign Analysis Report 1300, which is similar to the report from FIG. 12; however, results are broken down by specific transfer agent. FIG. 14 illustrates a Transfer Agent Analysis Report 1400, which shows the details of each transfer agent's performance related to transfer effectiveness. FIGS. 15 and 16 illustrate Performance Analysis reports 1500 and 1600, respectively, which show categorized breakdown of the results of each call. These reports group dialing results and performance into SUCCESSES, CONNECTS and OTHER results for any or all agents and campaigns. It includes "Total Dial Time" and "Total Dials and Connects Per Hour."

Figure 17:
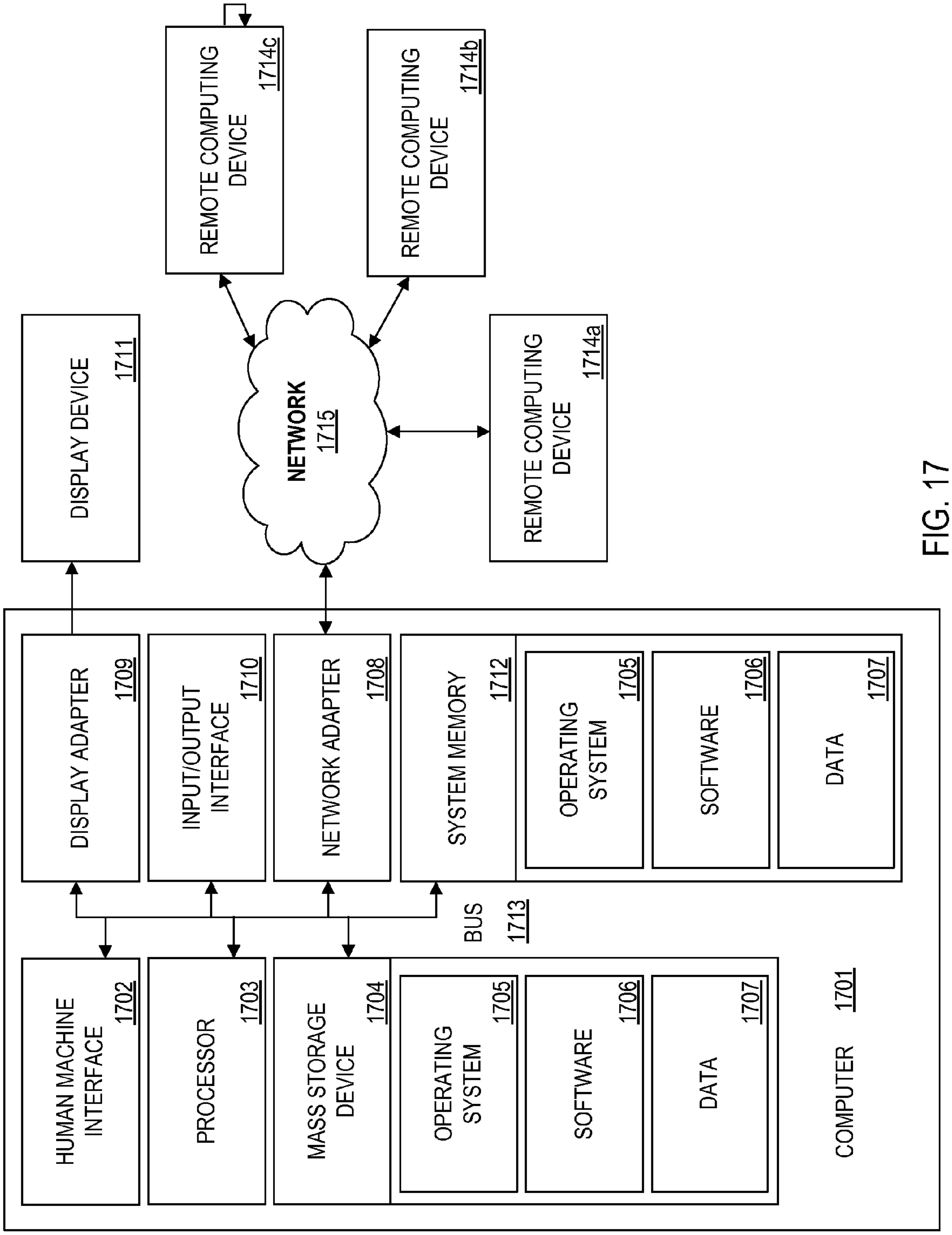
FIG. 17 is an exemplary computer system for use with any of the present inventions described herein.

Turning now to FIG. 17, one skilled in the art will appreciate that the systems and methods disclosed herein can be implemented via a general-purpose computing device in the form a computer 1701. The components of the computer 1701 can comprise, but are not limited to, one or more processors or processing units 1703, a system memory 1712, and a system bus 1713 that couples various system components including the processor 1703 to the system memory 1712. In the case of multiple processing units 1703, the system can utilize parallel computing.

The system bus 1713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1713, and all buses specified in this description can also be implemented over a wired or wireless network connection and each of the subsystems, including the processor 1703, a mass storage device 1704, an operating system 1705, software 1706, data 1707, a network adapter 1708, system memory 1712, an input/output interface 1710, a display adapter 1709, a display device 1711, a human machine interface 1702, can be contained within one or more remote computing devices 1714*a, b,c* at physically separate locations, connected through buses of this form, in effect implementing a fully distributed system.

The computer 1701 typically comprises a variety of computer readable media. Exemplary readable media can be any available media that is accessible by the computer 1701 and comprises, for example and not meant to be limiting, both volatile and non-volatile media, as well as, removable and non-removable media. The system memory 1712 comprises computer readable media in the form of volatile memory, such as random access memory (RAM), and/or non-volatile memory, such as read only memory (ROM). They system memory 1712 may contain data such as media, video, audio, or other data 1707 and/or program modules such as operating system 1705 and software 1706 capable of manipulating, translating, transcoding, or otherwise editing the data 1707 that are immediately accessible to and/or presently operated on the by the processing unit 1703.

In another aspect, the computer 1701 can also comprise other removable/non-removable, volatile/non-volatile computer storage media. By way of example, FIG. 17 illustrates a mass storage device 1704, which can provide non-volatile storage of computer code, computer readable instructions, data structures, program modules and other data for the computer 1701. For example, a mass storage device 1704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1704, including by way of example, an operating system 1705 and hosted VoIP PX software 1706. Each of the operating system 1704 and hosted VoIP PX software 1706 (or some combination thereof) can comprise elements of the programming and the hosted VoIP PX software 1706. Media, video, audio, or other data 1707 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PX software include Asterisk®, FreeSwitch®, or a Microsoft Lync® server software.

In another aspect, a user can enter commands and information into the computer 1701 via a client device or an input device (not shown). Example of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 1703 via a human machine interface 1702 that is coupled to the system bus 1713, but can be connected by other interface and bus structures, such as a parallel port, game port, and IEEE 1394 Port (also known as a Firewire port), a serial port, or a universal serial bus (USB).

In yet another aspect, a display device 1711 can also be connected to the system bus 1713 via an interface, such as a display adapter 1709. It is contemplated that the computer 1701 can have more than one display adapter 1709, and the computer 1701 can have more than one display device 1711. For example, a display device can be a monitor, an LCD (Liquid Crystal Display), or a projector. In addition to the display device 1711, other output peripheral devices can comprise components such as speakers (not shown) and a printer (not shown), which can be connected to the computer 1701 via input/output interface 1710. Any step and/or result of the methods can be output in any form to an output device. Such output can be any form of visual representation, including but not limited to, textual, graphical, animation, audio, tactile, and the like. The display 1711 and computer 1701 can be part of one device, or separate devices.

The computer 1701 can operate in a networked environment using logical connections to one or more remote computing devices 1714*a,b,c*. By way of example, a remote computing device can be a personal computer, portable computer, smartphone, softphone, client device, a server, a router, a network computer, a peer device or other common network node, and so on. Logical connections between the computer 1701 and remote computing device 1714*a,b,c* can be made via a network 1715, such as a local area network (LAN) and or a general wide area network (WAN). Such network connections can be through a network adapter 1708. A network adapter 1708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1705 are illustrated herein as discrete blocks, although it is recognized that such programs and components reside at various times in different storage components of the computing device 1701, and are executed by the data processor(s) of the computer. An implementation of media manipulation software 1706 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Finally, in view of the foregoing detailed description of preferred embodiments of the present invention, it readily will be understood by those persons skilled in the art that the present invention is susceptible to broad utility and application. While various aspects have been described in the context of screen shots, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as is being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A computerized system for efficiently and quickly calling cellular/mobile phones ("cell phones") of a large group of consumers/customers ("consumer") of a client in a manner compliant with the Telephone Consumer Protection Act ("TCPA"), comprising:

a call center database to contain a cleaned consumer call list of the client, wherein the cleaned consumer call list contains information associated with each of the large group of consumers of the client and wherein the information includes the name, client account number, and cell phone number of each respective consumer;

a plurality of call center workstations, wherein each call center workstation is operated by a respective transfer agent, includes an interactive display for use by the respective transfer agent, and is configured to enable the respective transfer agent to initiate a call to the cell phone number of a respective one of the large group of consumers of the client, speak with the respective one consumer, and transfer the call once the respective transfer agent has confirmed that the recipient of the call is the respective one consumer;

a plurality of client workstations, wherein each client workstation is operated by a respective client associate, is configured to receive the call with the respective one consumer when transferred by the respective transfer agent, and includes an interactive display for use by the respective client associate;

a cell phone communication processor in electronic communication with the call center database and with each of the call center workstations, wherein the cell phone communication processor includes non-transitory computer-readable media, and wherein the computer-readable media has computer-readable instructions which, when executed by the cell phone communication processor, causes the cell phone communication processor to perform the steps of:

retrieving the cell phone number of the respective one consumer from the cleaned consumer call list stored in the call center database;

receiving an initiate call instruction from the respective transfer agent to initiate the call;

in response to the initiate call instruction received from the respective transfer agent, dialing the cell phone number of the respective one consumer;

determining if a live voice is detected when the call is answered by the recipient and, if so, connecting the call to the respective transfer agent;

displaying the information associated with the respective one consumer on the interactive display of the respective work station of the respective transfer agent;

thereafter, receiving a transfer call instruction from the respective transfer agent to transfer the call to the respective client workstation of the respective client associate;

in response to the transfer call instruction, transferring the call to the respective client associate and providing the cell phone number of the respective one consumer as the origination number of the call;

after the call has been successfully transferred and a connection established between the respective one consumer and the respective client associate, disconnecting the connection between the respective one consumer and the respective transfer agent; and identifying a next consumer from the cleaned consumer call list to call and then awaiting a next initiate call instruction to be received from the respective transfer agent.

2. The computerized system of claim 1 further comprising a client database for storing an initial consumer call list.

3. The computerized system of claim 2 wherein the information associated with each of the large group of consumers included in the initial consumer call list is updated upon completion of calling of all of the cell phone numbers from the cleaned consumer call list.

4. The computerized system of claim 2 wherein the information associated with each of the large group of consumers included in the initial consumer call list is updated in the client database based on the results of the call between the respective one consumer and the respective client associate.

5. The computerized system of claim 2 wherein the information associated with each of the large group of consumers included in the initial consumer list is updated in the client database based on the results of the call between the respective one consumer and the respective transfer agent.

6. The computerized system of claim 2 wherein the cell phone communication processor performs the additional step of updating the information associated with the respective one consumer in the call center database after dialing the cell phone number of the respective one consumer.

7. The computerized system of claim 2 wherein the origination number of the call between the respective one consumer and the respective client associate is used to obtain information associated with the respective one consumer from the client database and to display said information during the call on the interactive display of the respective work station of the respective client associate.

8. The computerized system of claim 2 wherein the initial consumer call list is uploaded from the client database to the call center database.

9. The computerized system of claim 8 wherein the cell phone communication processor performs the additional step of converting the initial consumer call list into the cleaned consumer call list.

10. The computerized system of claim 9 wherein the cell phone communication processor converts the initial consumer call list to the cleaned consumer call list by eliminating any consumer records in which the cell phone number (i) has been converted to a landline number, (ii) is incomplete or has an invalid area code; (iii) is included on a "no call" list; (iv) is identified as a number that always rolls to an answering machine; (v) is identified as a number that is never answered; (vi) is identified as a duplicate cell phone number used with two or more consumer records.

11. The computerized system of claim 1 wherein the respective transfer agent provides the initiate call instruction to the cell phone communication processor by clicking on a button displayed on the interactive display of the respective work station of the respective transfer agent.

12. The computerized system of claim 1 wherein the respective transfer agent provides the initiate call instruction to the cell phone communication processor by hanging up the connection with the respective one consumer.

13. The computerized system of claim 1 wherein the respective transfer agent remains on the call between the respective one consumer and the respective client associate for a period of time after the call has been transferred to the respective client associate but before disconnecting the connection with the respective one consumer.

14. The computerized system of claim 1 wherein the respective transfer agent drops off the call between the respective one consumer and the respective client associate immediately upon transferring the call to the respective client associate.

15. The computerized system of claim 1 wherein the cell phone communication processor only permits a call to be made to the respective one consumer during a permitted time window defined by the TCPA and wherein the respective one consumer is assumed to be in a time zone based on (i) the area code of the cell phone number, (ii) the zip code of the address of the respective one consumer, or (iii) the overlap of both the area code and zip code.

16. The computerized system of claim 1 wherein, if the cell phone communication processor determines that a live voice is not detected, the cell phone communication processor then determines whether the call has been answered by an answering machine.

17. The computerized system of claim 16 wherein, if the cell phone communication processor determines that the call has been answered by the answering machine, the cell phone communication processor disconnects the call.

18. The computerized system of claim 16 wherein, if the cell phone communication processor determines that the call has not been answered by the answering machine, the cell phone communication processor hangs up the call, updates the information associated with the respective one consumer in the call center database to indicate a disposition of the call, identifies the next consumer from the cleaned consumer call list to call, and then awaits the next initiate call instruction to be received from the respective transfer agent.

19. The computerized system of claim 1 wherein, if the call with the cell phone number is successfully connected to the respective transfer agent but not successfully transferred to the respective client associate, the cell phone communication processor receives an explanation for the failed call transfer from the respective transfer agent, updates the information associated with the respective one consumer in the call center database to indicate the explanation for the failed call transfer, identifies the next consumer from the cleaned consumer call list to call, and then awaits the next initiate call instruction to be received from the respective transfer agent.

20. The computerized system of claim 19 wherein the cell phone communication processor provides a list on the interactive display of the respective work station of the respective transfer agent from which the respective transfer agent is able to select the explanation for the failed call transfer.

* * * * *